US012026250B2

(12) United States Patent
Crouch et al.

(10) Patent No.: US 12,026,250 B2
(45) Date of Patent: Jul. 2, 2024

(54) METHOD, SYSTEM, AND APPARATUS FOR SECURITY ASSURANCE, PROTECTION, MONITORING AND ANALYSIS OF INTEGRATED CIRCUITS AND ELECTRONIC SYSTEMS IN RELATION TO HARDWARE TROJANS

(71) Applicant: Amida Technology Solutions, Inc, Washington, DC (US)

(72) Inventors: Alfred L Crouch, Cedar Park, TX (US); Peter Lawrence Levin, Silver Spring, MD (US)

(73) Assignee: Amida Technology Solutions, Inc., Washington, DC (US)

( * ) Notice: Subject to any disclaimer, the term of this patent is extended or adjusted under 35 U.S.C. 154(b) by 0 days.

(21) Appl. No.: 18/144,060

(22) Filed: May 5, 2023

(65) Prior Publication Data

US 2024/0143743 A1 May 2, 2024

Related U.S. Application Data

(62) Division of application No. 16/145,891, filed on Sep. 28, 2018, now Pat. No. 11,681,795.

(51) Int. Cl.
*G06F 7/04* (2006.01)
*G06F 21/55* (2013.01)

(52) U.S. Cl.
CPC .......... *G06F 21/552* (2013.01); *G06F 21/554* (2013.01); *G06F 2221/034* (2013.01)

(58) Field of Classification Search
CPC ...... G06F 21/335; G06F 21/55; G06F 21/554; G06F 21/72; G06F 21/725; G06F 21/755; G06F 21/76; H04L 9/003; H04L 9/005
See application file for complete search history.

(56) References Cited

U.S. PATENT DOCUMENTS 8,983,073 B1 * 3/2015 Peterson ............... G06F 21/629
713/193
2011/0145934 A1 * 6/2011 Abramovici ............ G06F 21/76
726/30

(Continued)

OTHER PUBLICATIONS

Swarup Bhunia, Protection Against Hardware Trojan Attacks: Towards a Comprehensive Solution, Mar. 7, 2013, IEEE, pp. 6-17. (Year: 2013).*

(Continued)

*Primary Examiner* — Philip J Chea
*Assistant Examiner* — Jenise E Jackson
(74) *Attorney, Agent, or Firm* — Artie Pennington Law Offices, PLLC; Artie Pennington; Hannah Ward

(57) ABSTRACT

A method and system for analysis of a facility may include providing an emulation host system, first generating a golden circuit model on the emulation host system, first inserting a first hardware trojan model, first emulating operation of the golden circuit model, and second emulating operation of the first hardware trojan model. A facility may include a trojan instrument facility having a trojan detection instrument comparing logic circuit output against a threshold for detecting hardware trojan activity, and outputting alert data, and in relation to opening one of a plurality of scannable access points, a scannable register is inserted into an active scan chain with an associated instrument interface.

18 Claims, 17 Drawing Sheets

(56) References Cited

U.S. PATENT DOCUMENTS

| | | | |
|---|---|---|---|
| 2016/0098561 A1* | 4/2016 | Keller | G06F 21/566 |
| | | | 726/24 |
| 2018/0034793 A1* | 2/2018 | Kibalo | G06F 21/575 |
| 2018/0293537 A1* | 10/2018 | Kwok | G07F 17/26 |
| 2019/0103873 A1* | 4/2019 | Sechen | H03K 19/17744 |

OTHER PUBLICATIONS

Nicole Fern, Hiding Hardware Trojan Communication Channels in Partially Specified SoC Bus Functionality Dec. 12, 2016, IEEE, pp. 1435-1444. (Year: 2016).*

\* cited by examiner

METHOD, SYSTEM, AND APPARATUS FOR SECURITY ASSURANCE, PROTECTION, MONITORING AND ANALYSIS OF INTEGRATED CIRCUITS AND ELECTRONIC SYSTEMS IN RELATION TO HARDWARE TROJANS

CROSS-REFERENCE TO RELATED APPLICATIONS

This application is a divisional of U.S. Non-provisional patent application Ser. No. 16/145,891, filed 28 Sep. 2018 entitled "Method, System, And Apparatus For Security Assurance, Protection, Monitoring And Analysis Of Integrated Circuits And Electronic Systems In Relation To Hardware Trojans" ("Parent Application").

This application claims priority to the Parent Application and hereby claims benefit of the filing date thereof pursuant to 37 C.F.R. § 1.78(a)(4).

The subject matter of the Parent Application is expressly incorporated herein by reference.

FIELD OF THE INVENTION

The disclosure relates generally to methods, systems, and apparatus for security assurance, protection, monitoring and analysis of integrated circuits and electronic systems in relation to hardware trojans.

BACKGROUND OF THE INVENTION

In general, in the descriptions that follow, the first occurrence of each special term of art that should be familiar to those skilled in the art of integrated circuits ("ICs") and systems will be italicized. In addition, when a term that may be new or that may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, the mutually exclusive Boolean states may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Hereinafter, reference to a facility shall mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC, or distributed across multiple ICs. Depending on cost and other known considerations, the electronic components, including the facility-instantiating IC(s), may be embodied in one or more single- or multi-chip packages. However, unless expressly stated to the contrary, the form of instantiation of any facility shall be considered as being purely a matter of design choice.

Electronic systems and facilities (hereinafter referenced, collectively, as "facility" or plural "facilities") including circuits such as integrated circuits, chips, circuit boards, electronic devices, and components thereof, are subject to attacks and intrusions from malicious content or hardware trojans (hereinafter, collectively "hardware trojans"). As used herein, the term "hardware trojan" includes inherent malicious content or elements that may be included in a facility, and that may be exploited. For clarity, hardware trojans, as referenced herein, are to be distinguished from software trojans and related malicious software.

Hardware trojans, for example, may intend to function to break or prevent normal operation, allow unauthorized taking over or locking, steal data, steal circuit structure, degrade the hardware, degrade circuit operations, or inject errors into data being processed. A non-exhaustive listing of labels or references for hardware trojans includes, without limitation, the following: "denial of service" (DoS) indicating preventing the integrated circuit from conducting its normal function for some period of time; "ransomware" indicating the taking over or locking of an integrated circuit until a payment is extracted; "data theft" indicating that critical information stored or processed within the integrated circuit has been exfiltrated (such as, for example, customer information, account numbers and account passwords that can be used for identity theft and to access financial accounts); "structure theft" indicating that design or operation information concerning the electronic system or facility thereof has been exposed to enable reverse-engineering or counterfeiting; and "destructive operation" indicating that a facility or electronic system may be operated in such a manner as to provide physical damage (for example, operating built-in self-test logic (BIST) until a facility goes into thermal overload and physically melts).

The capability to allow these types of attacks stems from inadvertent or intentionally malicious content (i.e., "hardware trojans") included within the facility hardware, such as integrated circuit hardware. Instantiations of malicious content, both inadvertent and intentional, may be labeled or referenced by several names, but may be generally referred to as "security vulnerabilities" or "security exploits" (hereinafter, collectively, "security exploits"). Security exploits may be incorporated within a facility, or within an electronic system including a facility, at any point in design, development, integration, implementation, testing, programming, packaging, and distribution; or at any point in the design-manufacturing-distribution supply chain.

Some hardware trojans may remain hidden or dormant while the facility or associated electronic system is in operation, until activated or triggered. Hardware trojans, when activated, may deliver or perform a previously hidden, intended purpose or action, which may be referenced as delivering its' "payload."

Hardware trojans may be introduced into a facility, for example, when intellectual property (IP) cores ("IP cores") are licensed from third parties for incorporation in an integrated circuit design. IP cores may include hidden trojan circuits providing various security exploits. So, for example, a design engineer acting with a nefarious purpose may include one or more trojan circuits to perform undesired functions, such as providing unsecured or readily enabled back-door access or memory space for future software viruses and malware. A design engineer also may design tools that generate, insert or synthesize circuit content, such as test and debug logic, that may be modified to include hardware trojans. A design engineer may design tools or provide implementations that operate on one form of design model to create a different, undesired form of design model. For example, logic synthesis from a behavioral model to a gate-level model may be mapped to the gate library that targets a specific fabrication facility. Also, for example, where design tools may provide a place-and-route conversion from a gate-level model to a physical model that adds and includes power, clock, electro-static-discharge (ESD) protection structures, the tools may be corrupted by being designed to add hidden malicious content during the conversions. In some scenarios, a circuit design may be passing through the fabrication process, for example in an IC foundry, and subtle changes in doping and chemical exposure may result in transistors, gates, signal routes and insulation layers not behaving properly in the final implemented silicon device. For example, the impacted elements may be sensitive to voltage levels or temperature levels or temperature ranges, or may produce unexpected emissions. Also, for example, during the IC testing process a programming step may place identification numbers or encryption codes or other defining steps for the integrated circuit device, and the test process may be altered to either provide incorrect values, or may place the values in alternate places within the device, where the misplaced values may be snooped or leaked in the future. Even when the sliced-and-diced silicon is packaged into plastic or ceramic chip carriers, devices may have unused signal connections or unused functions connected to package pins to be accessed by nefarious parties in the future. In an example, a package pin may be accessed and act as a signal connection to leak data, but may be misidentified in the IC data book as a ground connection.

Hardware trojans may be incorporated within custom designs such as, for example, application specific integrated circuits (ASICs), or may be incorporated within designs destined to become standard parts. Examples may include application specific standard parts (ASSPs), microprocessors, microcontrollers, systems-on-a-chip (SOCs), and standardized memory chips (DDR, DIMMS, HBM, etc.). When electronic systems are made from these chips, either custom systems made from custom IC's or systems made from commercial-off-the-shelf ICs (COTS), there is a risk that one or multiple chips incorporated into the electronic design may be compromised, or that groupings of chips can be arranged together to allow access to trojan malicious content at the system level or to create complex trojan malicious content at the system level. In an example, a hardware trojan may provide back door access to secured kernel memory that holds a primary operating system.

One goal of hardware trojan attacks may be to hide or obscure the hardware trojan, and the event or trigger (hereinafter "trigger") used to activate the hardware trojan, from common forms of detection, such as during the verification, test and characterization process involved with the introduction of a new product; and the test, data-collection, evaluation, and yield-enhancement process involved with maintaining a yield target during manufacturing. To this end, some hardware trojans may be implemented with a scarcity of logic (such as just a doping change to silicon, or just an added transistor to a design that may include billions of transistors). Some hardware trojans may include extra routes hidden in plain sight, such as antenna loops added to the metal fill used to assist with chemical-mechanical-polishing (CMP). Hardware trojans and their triggers may be attached to a power domain that remains unpowered until activated by a rare event or contrived event that is known only by the nefarious party that intends to make use of the trojan hardware in the future. In some cases, even after a hardware trojan is activated and delivers its' payload, the payload action may be designed to resemble normal wear and tear, or faulty or defective behavior, of the targeted device or system, thus misleading the owner or user of the system to suspect a breakdown rather than a security attack. Some attacks, such as data exfiltration, may be meant to be invisible, so that the attack is not seen or detected by normal means. For example, radio-frequency (RF) emissions may be produced by trojan hardware from IC chips that do not possess known radio-frequency (RF) capability.

For reasons stated above and for other reasons which will become apparent to those skilled in the art upon reading and understanding the present specification, there is a need in the art for improved methods, systems, and apparatus for security assurance, protection, monitoring and analysis of facilities and electronic systems including circuits, such as integrated circuits, in relation to hardware trojans.

BRIEF DESCRIPTION OF THE INVENTION

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present disclosure provides methods, systems and apparatus for assurance, protection, analysis and monitoring of facilities, and electronic devices including facilities, that may provide improved detection, identification, functional and structural characterization, correction, curing and/or compensation for the presence and/or functions of hardware trojans, including associated trojan triggers and trojan payloads (hardware trojans, trojan triggers and trojan payloads being referenced, collectively, as "hardware trojans"). The present disclosure provides methods, systems and apparatus for improved assurance, protection, analysis and monitoring of facilities, and electronic devices including facilities, that do, or may, include one or more hardware trojans, which reduce or avoid complexity, difficulty and uncertainty that may be encountered when such a facility includes undetected, unpredicted or uncharacterized hardware trojans when designed, manufactured, tested, or placed into service. Embodiments according to this disclosure may recognize, avoid and/or reduce problems that may be encountered in providing and assuring operation of facilities, and electronic devices including same, where the subject integrated circuit may be placed into operation after a hardware trojan is activated by a trojan trigger or has delivered the trojan payload without detection, cure or compensation for the trojan. Embodiments according to this disclosure may recognize, avoid and/or reduce problems that may be encountered in providing and assuring operation of facilities, where subject facilities or silicon devices are, or may be, compromised and thus include, or may include, one or more hardware trojans, and the subject facility is available for integration and is to be placed into operation within the electronic system, wherein detection of the hardware trojan before it is activated and delivers its payload (such as, for example only, denial-of-service, take-over for ransomware, destructive operation, exfiltration of critical data, or degraded system performance) otherwise is significantly more difficult or improbable, and compensation or curing of the hardware trojans and nefarious functions of the hardware trojans also is significantly more difficult, or improbable. According to the present disclosure, methods, systems and apparatus may address, resolve or reduce impairments of operating facilities having one or more problems associated with, caused or impeded by the difficulty of detecting hardware trojans when the trojan is activated and/or the trojan payload is delivered. As further described below, these and other problems may be resolved in accordance with embodiments of this disclosure.

One problem is that operating a facility, IC or electronic system in all of the potential configurations to create a "trigger event" is not easily possible. Some "rare event" operations may not be anticipated by the facility, IC or system development originators.

Another problem is that operating a facility, IC or electronic system to the edge of "destruction" in order to activate a hardware trojan presents risk to the facility, IC or electronic system, and is not an activity generally consistent with existing, identified best practices for developers or users of systems. Operating a facility, IC or electronic system where a hardware trojan is actually active may result in destruction of the facility, IC or electronic system. Discovering that the hardware trojan is destructive may not be an acceptable outcome. For example, discovering that a hardware trojan resides in a fuel metering device, and activates within an aircraft only above 30,000 feet when certain high G-force load maneuvers are performed, such that the hardware trojan causes the fuel delivery to shut down completely, may be an unacceptable outcome.

One problem is that placing the facility or IC in a test or debug mode may activate an anti-trigger that ensures that the power driver for the hardware trojan and trigger logic is disabled. For example, when the manufacturing test scan-enable (SE) signal is transitioned to activate the capability to use scan chains to dump the state of the registers within the integrated circuit chip, the registers involved with the hardware trojan are excluded from the scan chains, and the power domain that includes those registers is disabled.

Another problem is that facilities, IC's, and electronic systems are tested and characterized economically in that they only possess test vectors and characterization vectors, and operating code when applied to the facility or IC represents only proving the specification of the intended design. If malicious content is contained within a facility, IC or electronic system, such as within an intellectual property core (IP core) that contains features which exceed need of the overall system (a common practice particularly where schedule determines delivery of a device), the excess features are not tested or characterized as part of the final design. Hardware trojans may be located within these hidden features, ports, signals, memories, etc., so that malicious content or back doors may be hidden. Capability or vectors do not exist in the final device for ordinary users to exercise this content, whereas a black hat attacker will have the necessary vectors and know the method to access the extra, hidden malicious content.

It is a problem that anomalous behaviors in a facility, IC or electronic system may result from actual defects, implementation errors, environmental sensitivities or conditions, design flaws, or specification bugs. Not all hardware trojan payloads can be instantly recognized as security attacks. Some hardware trojans may provide evidence as subtle as higher than normal power consumption, higher than normal operating temperature, noisy data transmissions, and other indicators that may fall within the normal operating range or represent operation outliers for defective devices. Debug and diagnosis of the device may take months in some cases and in some instances may result in final assessment of "no trouble found" or "cannot repeat". In some cases, devices may be assumed to be defective and discarded until the population of supposedly defective devices becomes large enough to attract attention for evaluation. Some hardware trojans may be intended to exactly cause early life-cycle fails, and thus reduce the reliability and reputation of electronic devices that were previously considered highly reliable.

It is a problem that operating a facility, IC or electronic system within a digital simulator is slow and may present an untenable time problem. For example, storing information in the cloud as part of simulating normal function might require weeks to simulate a normal interaction. Digital simulators may not be capable of accommodating parametric hardware trojans, analog hardware trojans, or trojan side-channel triggers. For example, where the trigger for a hardware trojan is a particular modulation of the system power supply to just above and just below the normal operating voltage, digital simulation of such a trigger may not be possible. Similarly, digital simulation may not be practical where a device includes a hardware trojan triggered by temperature conditions. In one example, a device may run hot in a normal operating mode, and when repeatedly cooled with a coolant spray, a thermal monitor may trigger a hardware trojan which provides an unplanned input code to the device. Similarly, digital simulation may not be practical where test logic is activated during operation to provide repeated di/dt droops, that broaden the clock pulses generated by an on-die phased-locked-loop (PLL), and the trigger is a frequency counter that can recognize the slow down activity. Digital simulation may not be practical where events are outside the detection and parameters of a digital simulator. Using a mixed-mode simulator also may require identifying and modeling all analog or parametric features, in addition to the digital features, and such a mixed-mode simulation may be further slowed to a degree that is impractical or unworkable.

In one aspect, methods and systems are provided through which security of a target facility, such as an integrated circuit, is analyzed by emulation, in an emulation host system, of a golden circuit model and first hardware trojan model. Such a system may include a library of hardware trojan model files and a library of trigger model files. The system may include a library of instrument model files and a library of countermeasure files. The system may include a physical effects model of physical effects which may camouflage a trigger. An instrumented golden model bit-file, instrumented trojan model bit-file, or both may be synthesized in an emulation synthesis module. The emulation host system may include a programmable emulation hardware component, which may include a programmable FPGA. An emulation operating module may manage emulation operation of the synthesized instrumented golden model bit-file, instrumented trojan model bit-file, or both. A data collection module may collect and record data of the emulation operation of the synthesized bit-files. A data analysis module may analyze collected data in relation to a library of collected data for other instances, to identify correlations for developing profile signatures of hardware trojans.

In one aspect, methods and systems are provided through which facilities, IC's and electronic systems may be designed, manufactured, tested and placed into service with improved assurance, protection, analysis and monitoring of operation of the facility, IC or electronic system analyzed by emulation, in an emulation host system, of a golden circuit model and first hardware trojan model. Such a system may include a library of hardware trojan model files and a library of trigger model files. The system may include a library of instrument model files and a library of countermeasure files.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein.

DETAILED DESCRIPTION OF THE INVENTION

Figure 1:
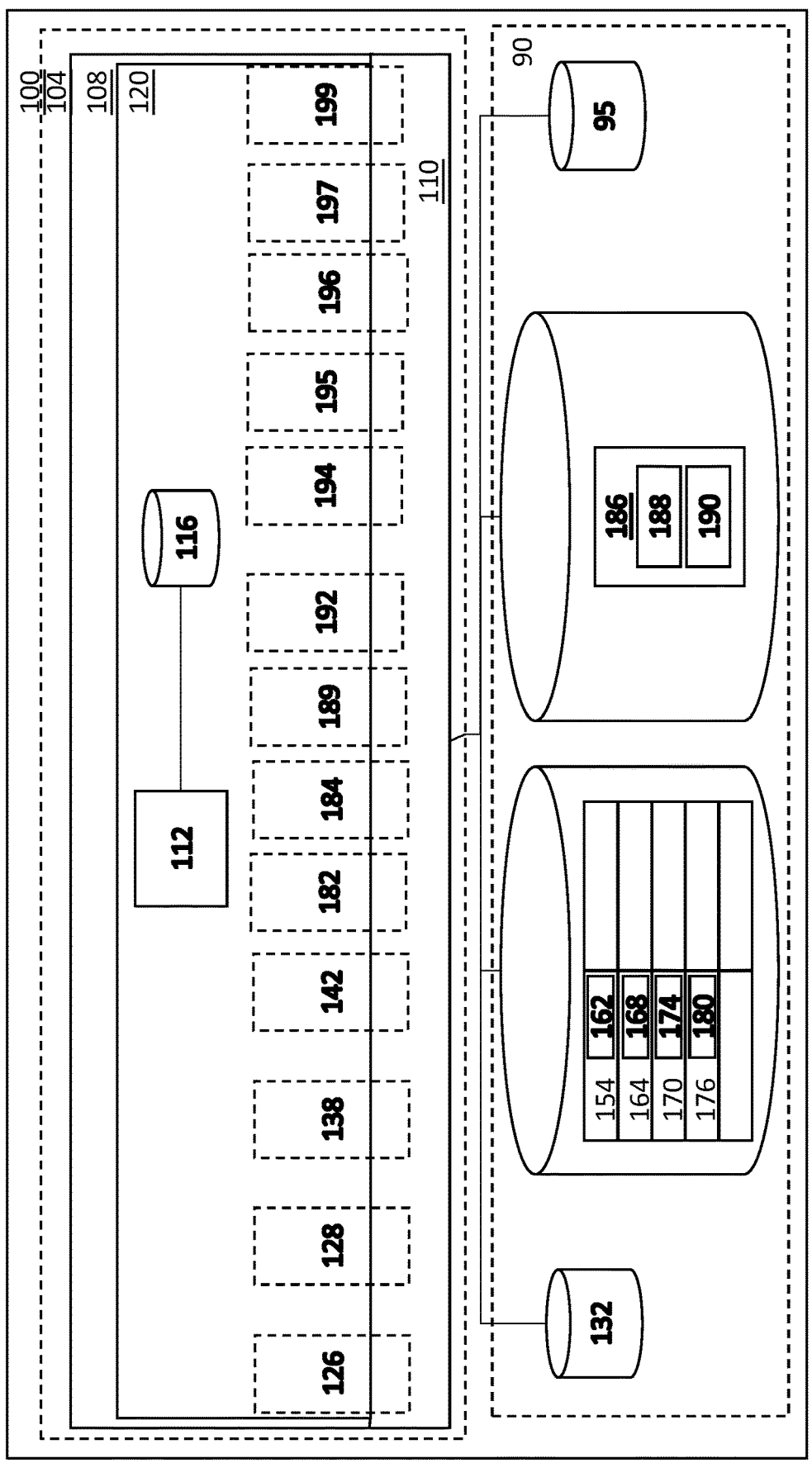
FIG. 1 is a simplified block diagram of a system for analyzing security of a target facility, in an exemplary embodiment.

In this detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Illustrated in FIG. 1 is a simplified system diagram of a system 100 for analyzing security of a target facility (not shown), in an exemplary embodiment. System 100 includes an emulation host system 104. Emulation host system 104 may include a programmable hardware component 108 and programmable software component 110. Programmable hardware component 108 may include one or more processors 112 operably coupled to memory 116. In embodiments, programmable hardware component 108 may include a field programmable gate array (FPGA) 120. An FPGA of the Virtex® family made by Xilinx Inc., San Jose, California, is suitable. A suitable emulation host system 104 may be a Vivado® Simulator system available from Xilinx Inc., San Jose, California. A suitable emulation host system 104 may support mixed-language simulation and may include a hardware description compiler 126. Hardware description compiler 126 may include, for example, a compiler for an IEEE standard hardware description language (HDL) such as Verilog, SystemVerilog™, VHDL, or other hardware description language. In embodiments, emulation host system 104 may include one or more design conversion modules 128 configured to convert the high-level description to a logic-level register transfer level (RTL) description, a gate-level (GL) description, a layout-level description, or a mask-level description. A golden circuit model file 132 of the target facility (not shown) may be generated from a design library or other automated design technique. The golden circuit model file 132 may be synthesized from a design specification in a hardware description language (HDL), files or group of files, register transfer level (RTL) description, a gate-level (GL) description, a layout-level description, or a mask-level description, or from a netlist.

In embodiments, emulation host system 104 for emulation may include memory 116 which stores instructions, and one or more processors 112 coupled to the memory 116 to process instructions accessed in the memory 116. The one or more processors 112 may be configured to receive the golden circuit model file 132 for emulation. In some embodiments, the high-level design may be embodied in an IEEE standard hardware description language (HDL), Verilog, SystemVerilog™, VHDL, logic-level register transfer level (RTL) description, a gate-level (GL) description, a layout-level description, or a mask-level description. The golden circuit model file 132 design description may be compiled in a suitable hardware description language compiler.

Emulation host system 104 may include a clocked control and data flow graph (CCDFG) module 138 configured to provide control graphs for emulating operation of the golden circuit model. It will be understood that the CCDFG module 138 may identify or represent state-change or input-change bits. Emulation host system 104 may include an evaluating module 142 for producing emulation results from the CCDFG module.

System 100 for analyzing security of a target facility (not shown) may include a hardware trojan model file library 154. Hardware trojan model file library 154 may include a plurality of hardware trojan model files ("hardware trojan models"). Hardware trojan model file library 154 may include a first hardware trojan model file 162. The first hardware trojan model file 162 may be inserted into golden circuit model 132.

Referring to FIG. 1, in some embodiments, the first hardware trojan model file 162 may include all, or any, of the following: a first trojan payload model, a first trojan trigger model, a first trojan installation model, a first trojan content model, a first trojan operation model, and a first trojan behavior profile model. In some embodiments, a first trojan identification profile or signature profile may include all, or any, of the following: a first trojan payload model, a first trojan trigger model, a first trojan installation model, a first trojan content model, a first trojan operation model, a first trojan behavior profile model.

System 100 for analyzing security of a target facility (not shown) may include a trigger model file library 164. Trigger model file library 164 may include a plurality of trigger model files ("trigger models"). Trigger model file library 164 may include a first trigger model file 168. The first trigger model file 168 may be inserted into golden circuit model 132.

System 100 for analyzing security of a target facility (not shown) may include an instrument model file library 170. Instrument model file library 170 may include a plurality of instrument model files ("instrument models"). Instrument model file library 170 may include a first instrument model file 174. The first instrument model file 174 may be inserted into golden circuit model 132.

System 100 for analyzing security of a target facility (not shown) may include a countermeasure model file library 176. Countermeasure model file library 176 may include a plurality of countermeasure model files ("countermeasure models"). Countermeasure model file library 176 may include a first countermeasure model file 180. The countermeasure model file 180 may be inserted into golden circuit model 132.

System 100 for analyzing security of a target facility (not shown) may include a golden model file analysis module 192. Golden model file analysis module 192 may resolve analysis of the golden circuit model file 132.

System 100 for analyzing security of a target facility (not shown) may include an insertion process resolution module 182. Insertion process resolution module 182 may resolve insertion of the golden circuit model file 132 in relation to the emulation host system 104. Insertion process resolution module 182 may resolve insertion of the first hardware trojan model file 162, first trigger model file 168, first instrument model file 174 and file countermeasure model file 180 in relation to the golden circuit model file 132, emulation host system 104, or both.

System 100 for analyzing security of a target facility (not shown) may include an emulation synthesis resolution module 184. Emulation synthesis resolution module 184 may resolve synthesis of emulation bit-files 186. The emulation bit-files 186 may include an instrumented golden model bit-file 188, instrumented trojan model bit-file 190, or both.

System 100 for analyzing security of a target facility (not shown) may include an emulation hardware programming module 194. Emulation hardware programming module 194 may manage programming of the hardware component 108 to configure same to perform emulation operation in relation to the synthesized emulation bit-files 186, including the instrumented golden model bit-file 188, instrumented trojan model bit-file 190, or both.

System 100 for analyzing security of a target facility (not shown) may include an emulation hardware operation module 195. Emulation hardware operation module 195 may manage emulation operation of the emulation host system 104 to perform emulation operations in relation to the synthesized emulation bit-files 186, including the instrumented golden model bit-file 188, instrumented trojan model bit-file 190, or both.

System 100 for analyzing security of a target facility (not shown) may include an emulation data collection module 196. Emulation data collection module 196 may manage data collection from emulation operations of the synthesized emulation bit-files 186, including the instrumented golden model bit-file 188, instrumented trojan model bit-file 190, or both.

System 100 for analyzing security of a target facility (not shown) may include an emulation data analysis module 197. Emulation data analysis module 197 may manage analysis of data collected by data collection module 196 from emulation operations of the synthesized emulation bit-files 186, including the instrumented golden model bit-file 188, instrumented trojan model bit-file 190, or both.

In some embodiments, the emulation host system 104 may include an FPGA. In embodiments, the emulation host system may include an FPGA and circuit board in communication with said FPGA. In some embodiments, the emulation host system may include an access port 189 supporting JTAG protocol for communication with the FPGA.

In some embodiments, system 100 may include a Faraday cage (not shown in FIG. 1) configured to isolate the emulation host system 104 and all file libraries 90 from electromagnetic attack. In some embodiments, the plurality of file libraries 90 may include a library 95 of archived data collected in security analysis of a plurality of target facilities. System 100 may include an analysis module 199 including a machine learning sub-module, configured to determine correlations from the library 95 of archived data.

Figure 2:
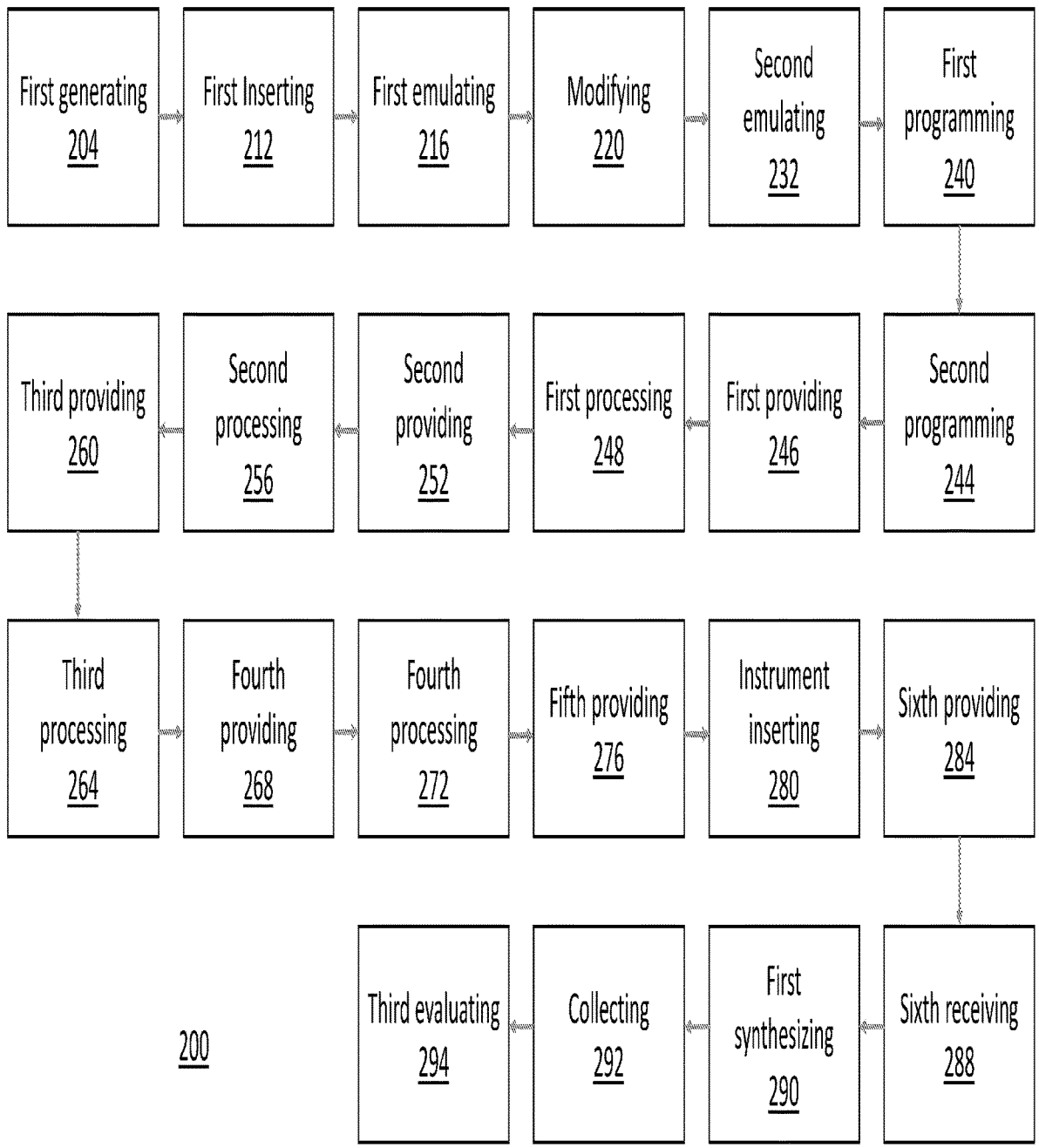
FIG. 2 is a simplified flow diagram of a method for analyzing security of a target facility, in an exemplary embodiment.

FIG. 2 is a simplified flow illustrating a method 200 for analyzing security of a target facility (not shown), in an exemplary embodiment. Method 200 may include: first generating 204 a golden circuit model on an emulation host system. The golden circuit model may be generated by synthesis from a detailed specification in a design library, other automated design technique, hardware description language (HDL), files or group of files, register transfer level (RTL) description, a gate-level (GL) description, a layout-level description, a mask-level description, or a netlist. In embodiments, the golden circuit model may be identical to golden circuit model 132 of system 100, or may differ as otherwise described herein.

Referring to FIG. 2, method 200 may include: second providing 208 a first hardware trojan model of a first hardware trojan. Method 200 may include: first inserting 212 the first hardware trojan model on the emulation host system. Except as otherwise described or illustrated, the first hardware trojan model may be identical to first hardware trojan model file 162 of system 100. Method 200 may include first emulating 216, by the emulation host system, operation of the golden circuit model. Method 200 may include modifying 220 the golden circuit model, upon the first inserting 216 of the first hardware trojan model, to provide a trojan-modified portion of the golden circuit model. Thus, in the first emulating 216, the golden circuit model may include the trojan-modified portion of the golden circuit model.

Method 200 may include second emulating 232 operation of the first hardware trojan model in relation to the first emulating. The second emulating 232 may be performed by operation the emulation host system.

Method 200 may include first programming 240 the programmable hardware component to configure the same to perform the first emulating 216. Method 200 may include second programming 244 the programmable application software component to configure the same to embody the first hardware trojan model. Second programming 244 may include configuring the programmable application software component to perform emulation operation, simulation operation, or both, in relation to the first hardware trojan model.

Method 200 may include first providing 246 an external physical effects model. Method 200 may include first processing 248 the external physical effects model, by the emulation host system. The external physical effects may provide a camouflaged first trojan trigger. The external physical effects model may include model effects selected from the group consisting of: parametric effects, analog effects, and side-channel effects.

Method 200 may include second providing 252 a first analog effects model of a first analog function affecting the target facility. Method 200 may include second processing 256 the first analog effects model, by the emulation host system.

Method 200 may include third providing 260 a first thermal effects model of a first thermal function affecting the target facility. Method 200 may include third processing 264 the first thermal effects model, by the emulation host system.

Method 200 may include fourth providing 268 a first fabrication effects model of first fabrication variables affecting the target facility. Method 200 may include fourth processing 272 the first fabrication effects model, by the emulation host system.

Method 200 may include fifth providing 276 a programmable circuit instrumentation fabric. Method 200 may include instrument inserting 280 into the golden circuit model, to provide an instrumented golden circuit model. In some embodiments, the above-referenced first inserting 212 of the first hardware trojan model may be embodied by providing the programmable circuit instrumentation fabric and programming the circuit instrumentation fabric to embody the first hardware trojan model.

Method 200 may include sixth providing 284 model instrumentation in relation to the golden circuit model. Method 200 may include sixth receiving 288, by the model instrumentation, data in relation to the golden circuit model.

Method 200 may include first synthesizing 290, by the emulation host system, an instrumented golden circuit model including instrumentation and a trojan-modified portion. Method 200 may include collecting 292 data of the first emulating. Method 200 may include third emulating 294, by the emulation host system, a countermeasure. Method 200 may include, in the first emulating, first configuring a programmable hardware component of the emulation host system with the golden circuit model.

In some embodiments of method 200, in the first emulating, the golden circuit model may be a synthesized golden circuit model including modifying content. The modifying content may include: programmable circuit instrumentation, programmable circuit instrumentation fabric, model instrumentation, and/or the first hardware trojan model.

Figure 3:
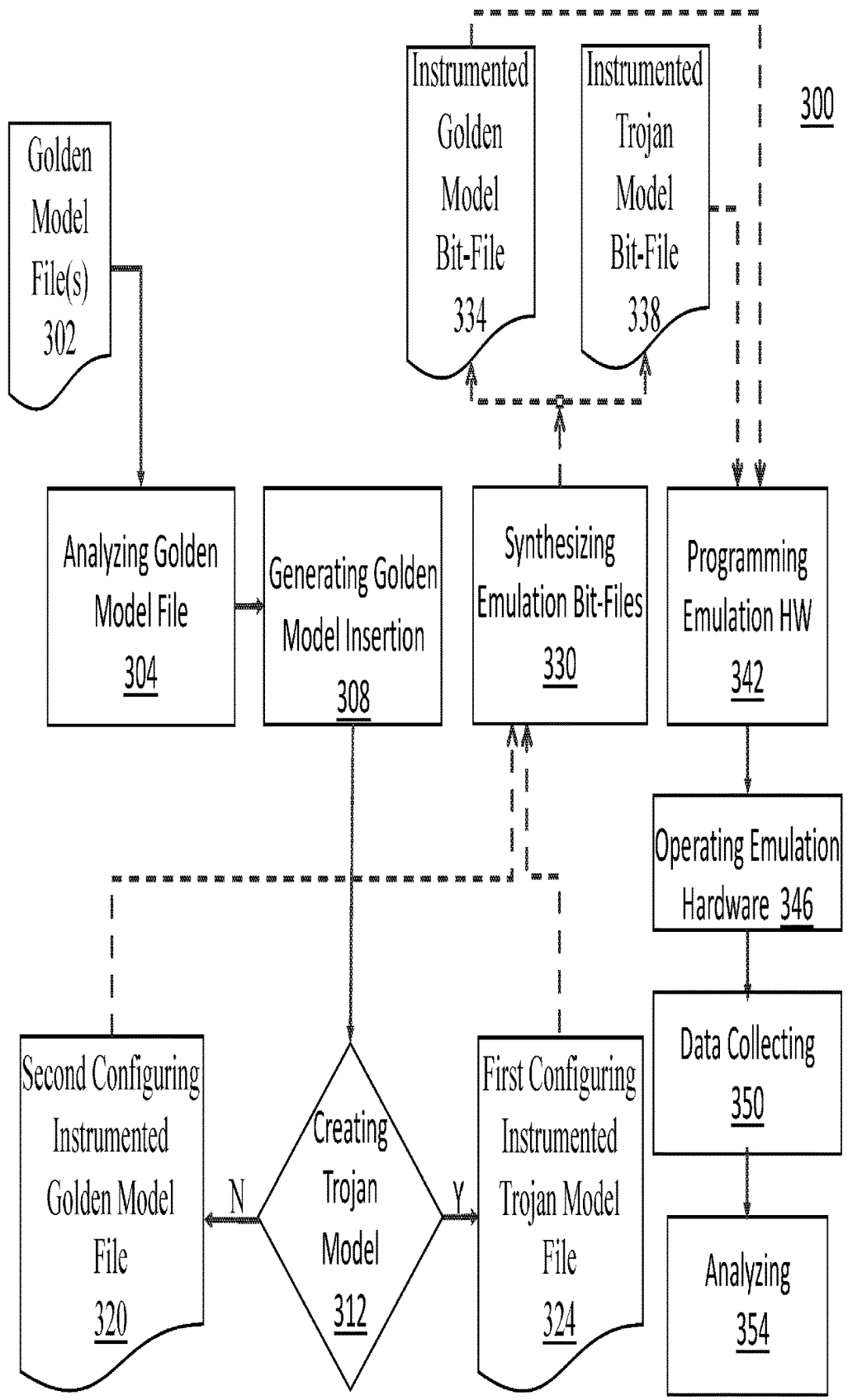
FIG. 3 is a simplified flow diagram of a method for analyzing security of a target facility, in an exemplary embodiment.

FIG. 3 is a simplified flow diagram of a method 300 for analyzing security of a target facility, by analyzing a golden circuit model in an emulator host system, in an exemplary embodiment. Method 300 may be identical to method 200 previously described herein, except as otherwise described or illustrated. Method 300 may include analyzing 304 a golden circuit model file 302. Method 300 may include generating a golden circuit model file 308. Method 300 may include creating 312 a first hardware trojan model. Method 300 may include first configuring 324 an instrumented first hardware trojan model. Method 300 may include second configuring 328 an instrumented golden circuit model. Method 300 may include synthesizing 330 emulation bit-files, which may include an instrumented golden circuit model bit-file 334 and instrumented hardware trojan model bit-file 338. Method 300 may include programming 342 an emulation hardware component of the emulation host system. Method 300 may include operating 346 the emulation hardware component to emulate operation of the golden circuit model, by operation of the instrumented golden circuit model bit-file 334 and instrumented hardware trojan model bit-file 338. Method 300 may include collecting 350 data for emulation operation of the instrumented golden circuit model bit-file 334 and instrumented hardware trojan model bit-file 338. Method 300 may include analyzing 354 collected data of emulation operation of the instrumented golden circuit model bit-file 334 and instrumented hardware trojan model bit-file 338.

Figure 4:
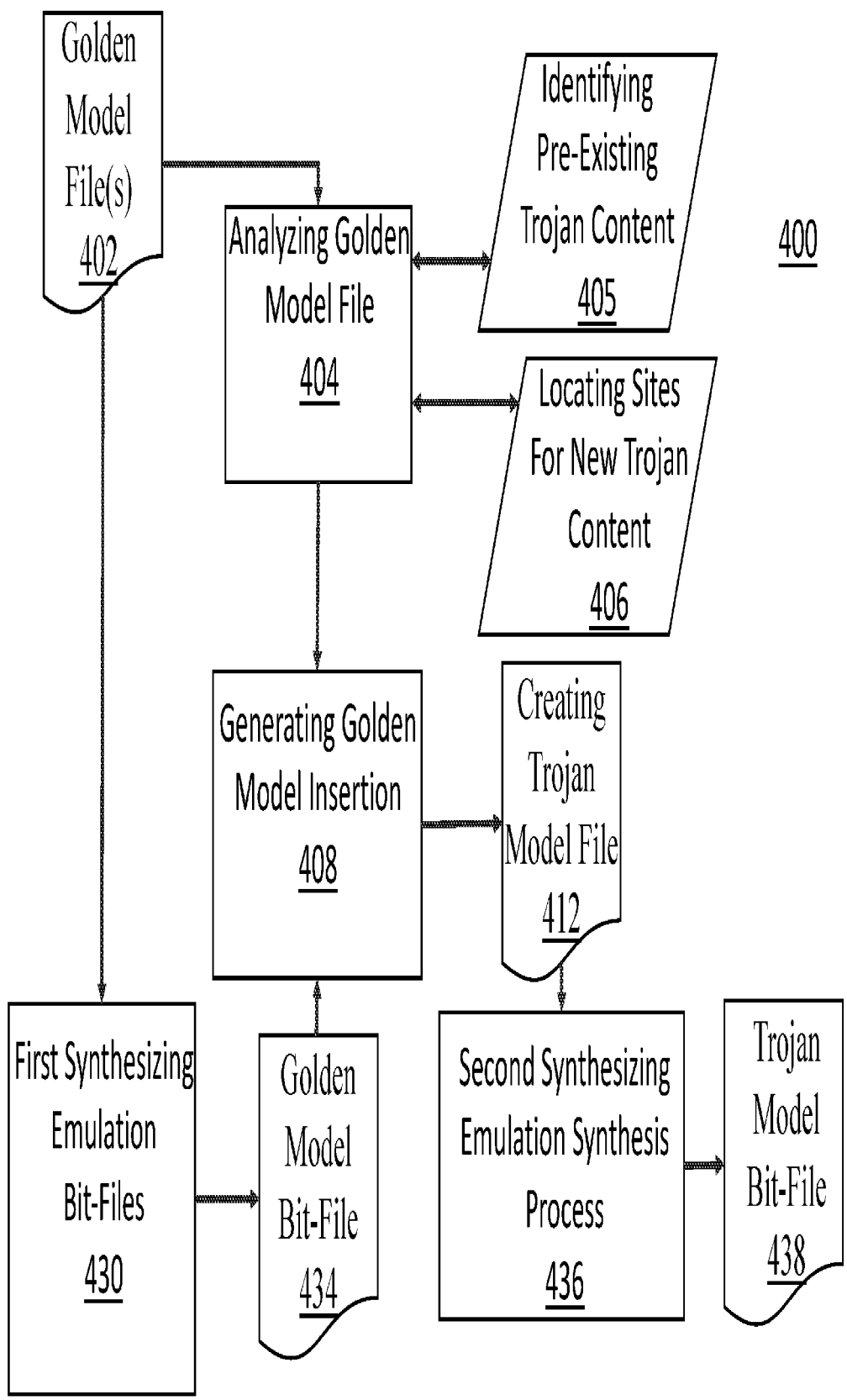
FIG. 4 is a simplified flow diagram of a method for analyzing security of a target facility, in an exemplary embodiment.

FIG. 4 is a simplified flow diagram of a method 400 for analyzing security of a target facility, by analyzing a golden circuit model in an emulator host system, in an exemplary embodiment. Method 400 may be identical to method 300 previously described herein, except as otherwise described or illustrated. Identifying 405 of pre-existing trojan content in the golden circuit model is performed in relation to analyzing 404 the golden circuit model. Locating 406 is performed to identify locations for new trojan content to be added.

Figure 5:
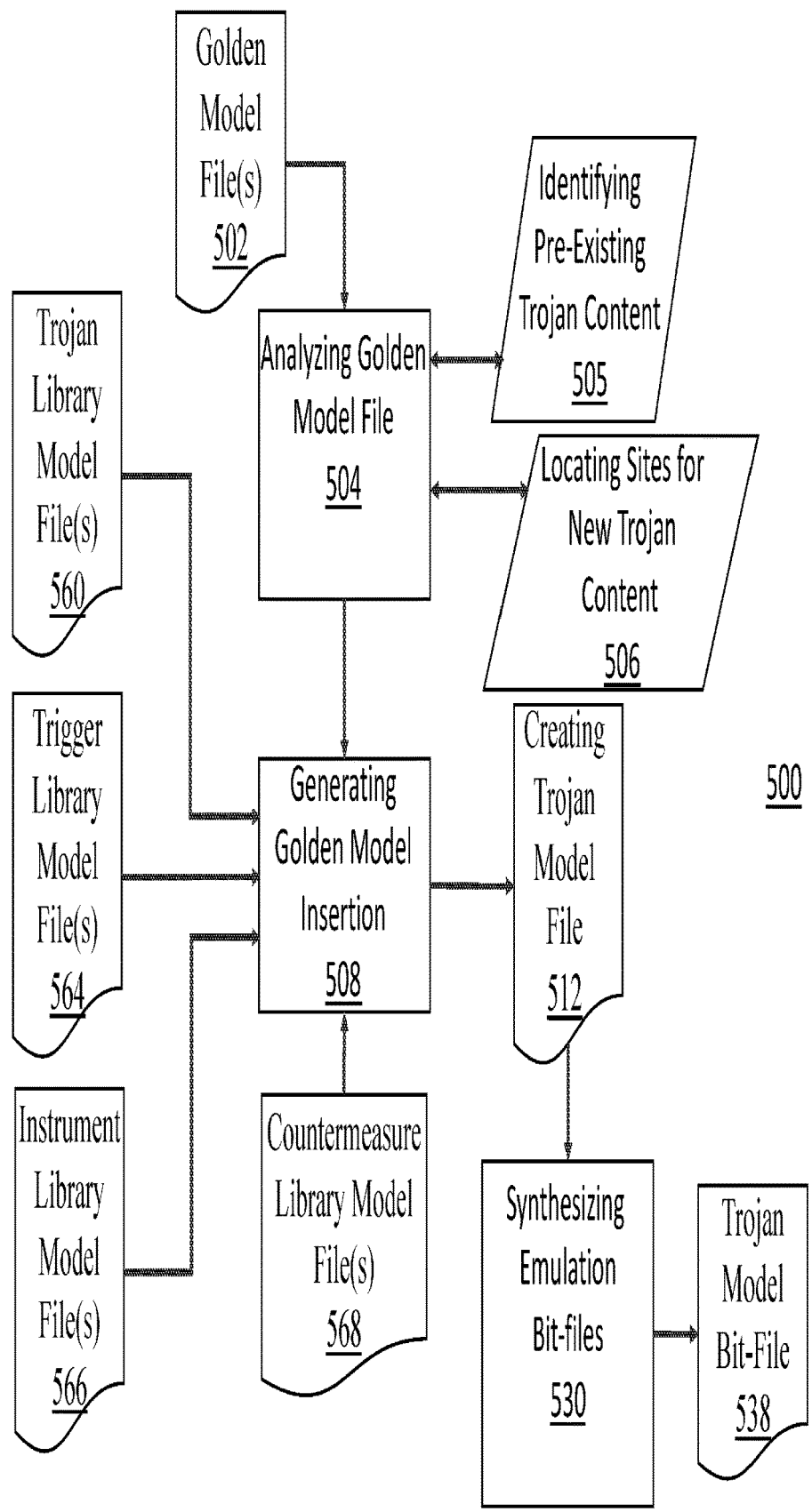
FIG. 5 is a simplified flow diagram of a method for analyzing security of a target facility, in an exemplary embodiment.

FIG. 5 is a simplified flow diagram of a method 500 for analyzing security of a target facility, by analyzing a golden circuit model in an emulator host system, in an exemplary embodiment. Method 500 may be identical to method 300 previously described herein, except as otherwise described or illustrated. Identifying 505 of pre-existing trojan content in the golden circuit model is performed in relation to analyzing 504 the golden circuit model 502. Locating 506 is performed to identify locations for new trojan content to be added. The emulation host system includes multiple libraries: hardware trojan model files library 560, trigger model files library 564, instrument model files library 566 and countermeasure model files library 568. When generated 508, the golden circuit model may include a selected model file of each library.

Figure 6:
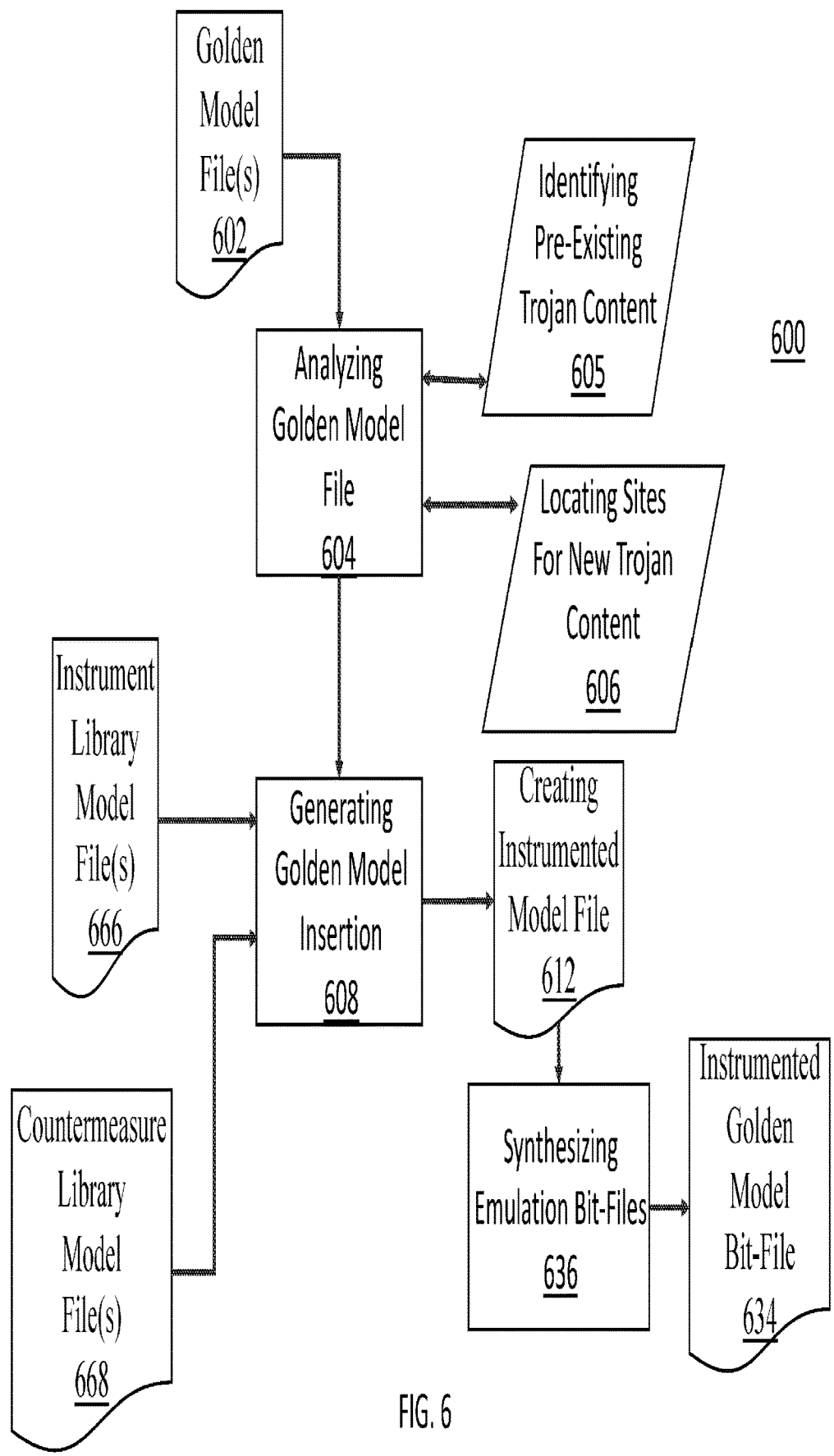
FIG. 6 is a simplified flow diagram of a method for analyzing security of a target facility, in an exemplary embodiment.

FIG. 6 is a simplified flow diagram of a method 600 for analyzing security of a target facility, by analyzing a golden circuit model in an emulator host system, in an exemplary embodiment. Method 600 may be identical to method 500 previously described herein, except as otherwise described or illustrated. Identifying 605 of pre-existing trojan content in the golden circuit model is performed in relation to analyzing 604 the golden circuit model 602. Locating 606 is performed to identify locations for new trojan content to be added in the golden circuit model 602. The emulation host system includes instrument model files library 666 and countermeasure model files library 668. When generated 608, an instrumented golden circuit model may be created 612.

Figure 7:
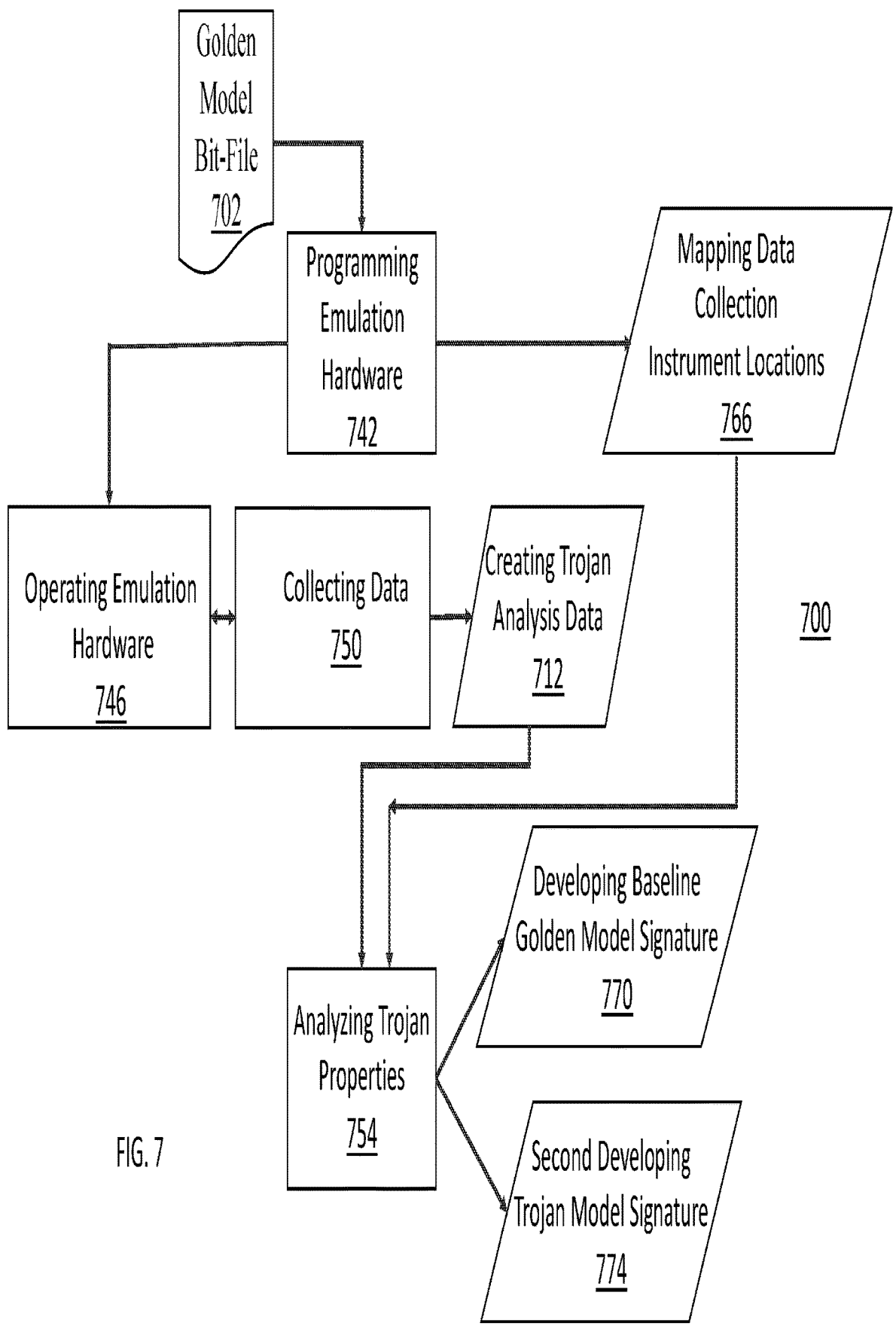
FIG. 7 is a simplified flow diagram of a method for analyzing security of a target facility, in an exemplary embodiment.

FIG. 7 is a simplified flow diagram of a method 700 for analyzing security of a target facility, by analyzing a golden circuit model in an emulator host system, in an exemplary embodiment. Method 700 may be identical to method 300 previously described herein, except as otherwise described or illustrated. Mapping 766 of instrument locations is performed in relation to the golden circuit model 702. Analyzing 754 of hardware trojan properties is performed. Method 700 includes the step of developing 770 a baseline golden model signature. Method 700 includes the step of second developing 774 a hardware trojan model signature.

Figure 8:
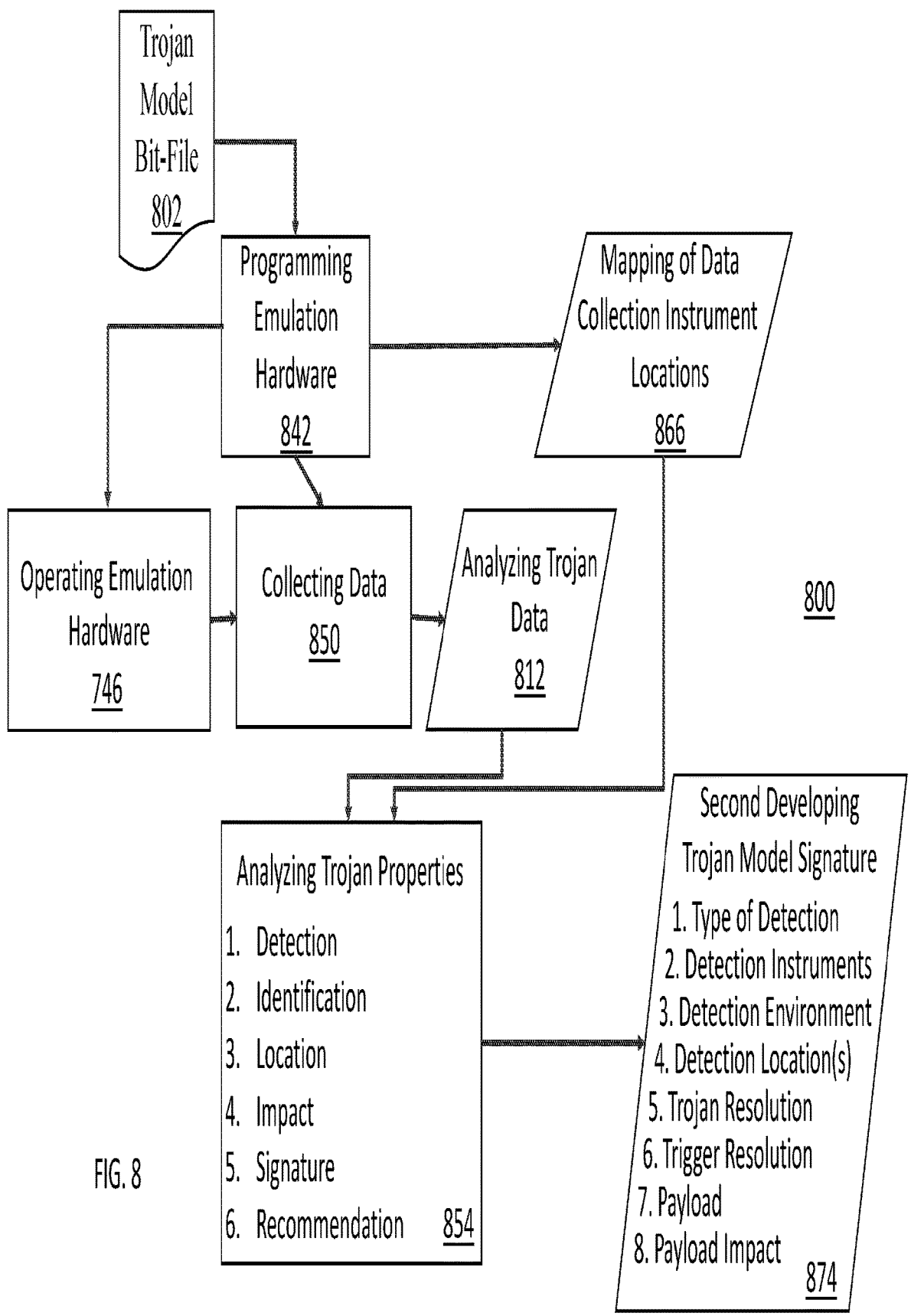
FIG. 8 is a simplified flow diagram of a method for analyzing security of a target facility, in an exemplary embodiment.

FIG. 8 is a simplified block diagram of a method 800 for analyzing security of a target facility, by analyzing a golden circuit model in an emulator host system, in an exemplary embodiment. Method 800 may be identical to method 700 previously described herein, except as otherwise described or illustrated. Analyzing 854 of hardware trojan properties is performed. Method 800 includes the step of developing 870 a baseline golden model signature. Method 800 includes the step of second developing 874 a hardware trojan model signature.

Figure 9:
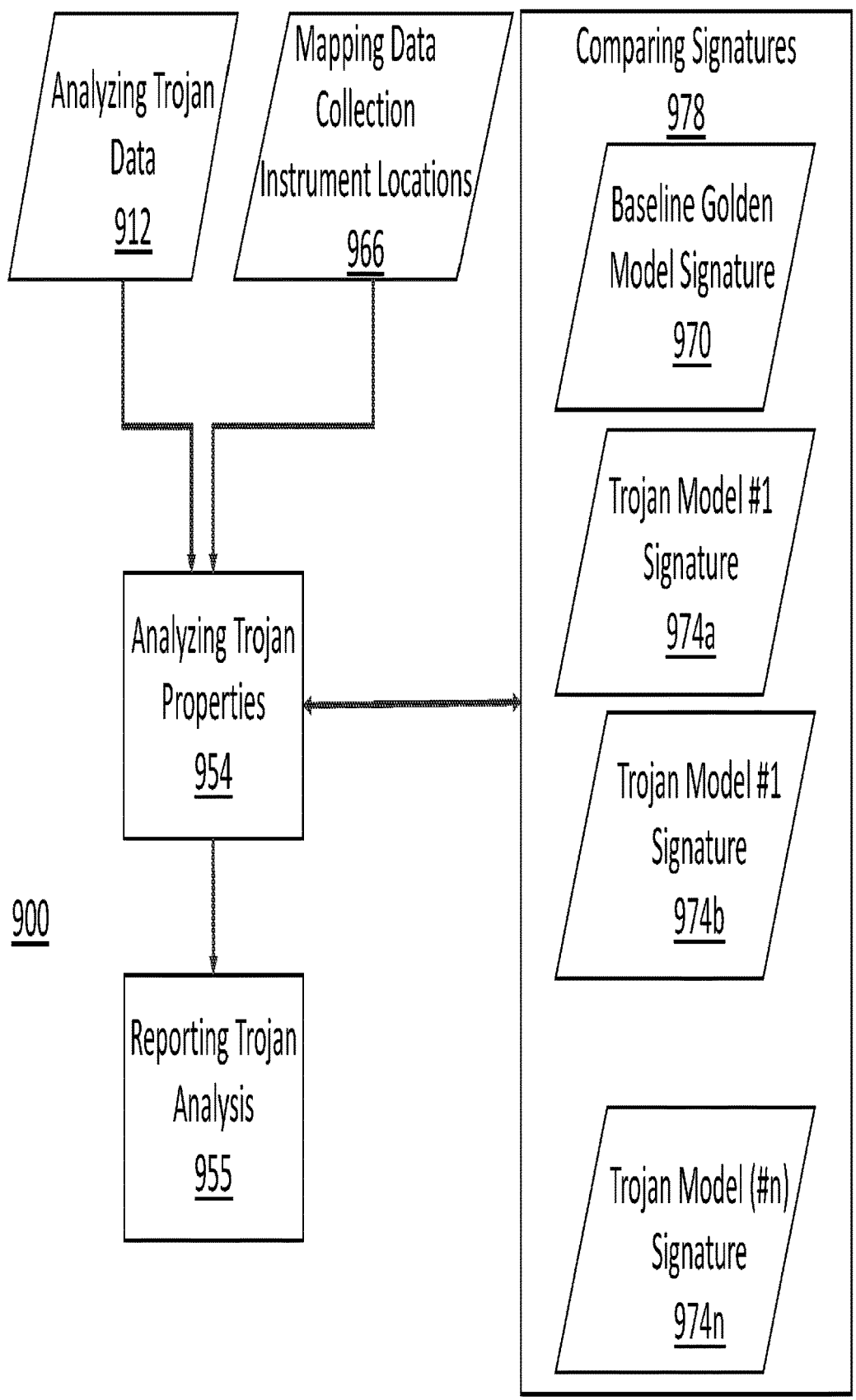
FIG. 9 is a simplified flow diagram of a method for analyzing security of a target facility, in an exemplary embodiment.

FIG. 9 is a simplified block diagram of a method 900 for analyzing security of a target facility, by analyzing a golden circuit model in an emulator host system, in an exemplary embodiment. Method 900 may be identical to method 800 previously described herein, except as otherwise described or illustrated. Method 900 includes comparing 978 signatures. Comparing 978 includes comparing signatures of a subject golden circuit model 970 with a database of pre-existing golden circuit model signatures. Comparing 978 includes comparing signatures of a subject trojan model 974a, 974b, 974n with a database of pre-existing golden circuit model signatures. Method 800 includes the step of second developing 874 a hardware trojan model signature.

Figure 10:
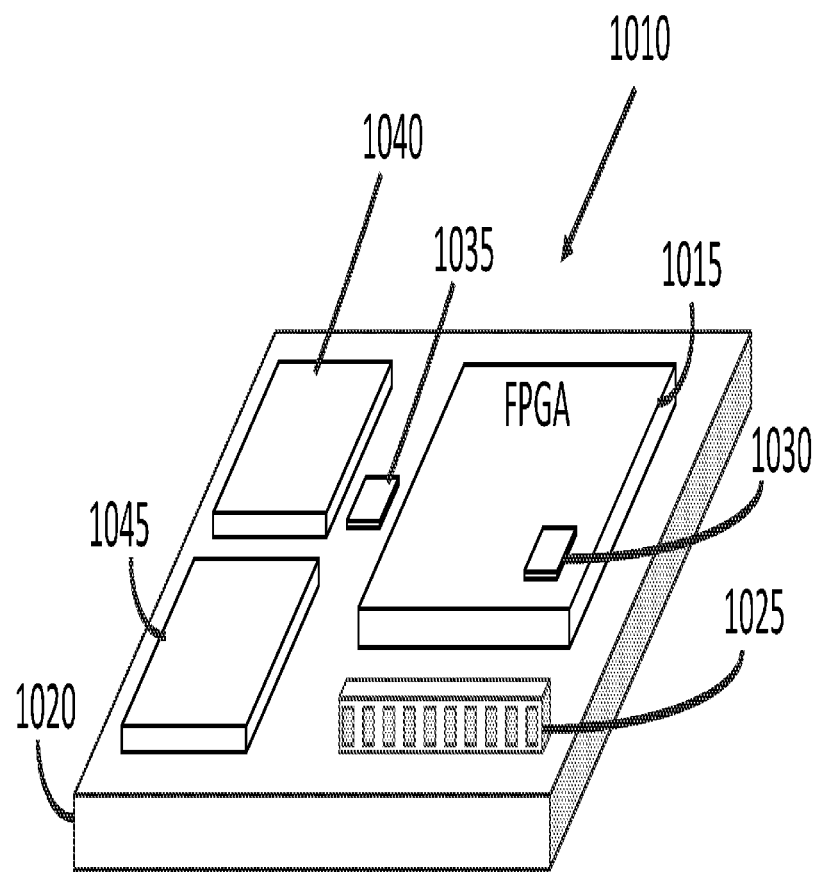
FIG. 10 is a simplified block diagram of an emulation host system for analyzing security of a target facility, in an exemplary embodiment.

FIG. 10 is a simplified block diagram of a system 1000 for analyzing security of a target facility, by analyzing a golden circuit model in an emulator host system, in an exemplary embodiment. System 1000 may include an emulation host system 1010. Emulation host system 1010 may include a programmable hardware component 1015. Programmable hardware component 1015 may include an FPGA electrically coupled with a circuit board 1020. The FPGA is programmable to emulate a golden circuit model. In other embodiments (not shown), the programmable hardware component may include, for example, a system-on-chip (SOC) or ASIC. Circuit board 1020 may include an on-board connector 1025. First detection instruments 1030 may be configured within the programmable FPGA. Second detection instruments 1035 also may be located on the circuit board 1020 near FPGA 1015. The exemplary circuit board 1020 may be accessed or combined with other circuit boards (not shown) through one or more of the on-board connectors 1025. The circuit board 1020 may may include many other supporting integrated circuits, both digital 1040 and analog 1045, to support the use and operation of the circuit board 1020 as a standalone device or ganged together with other circuit boards. The supporting circuits may include, for example, voltage conditioning ICs, signal repeater ICs, switches, buttons, LED displays, and other supporting circuits.

Figure 11:
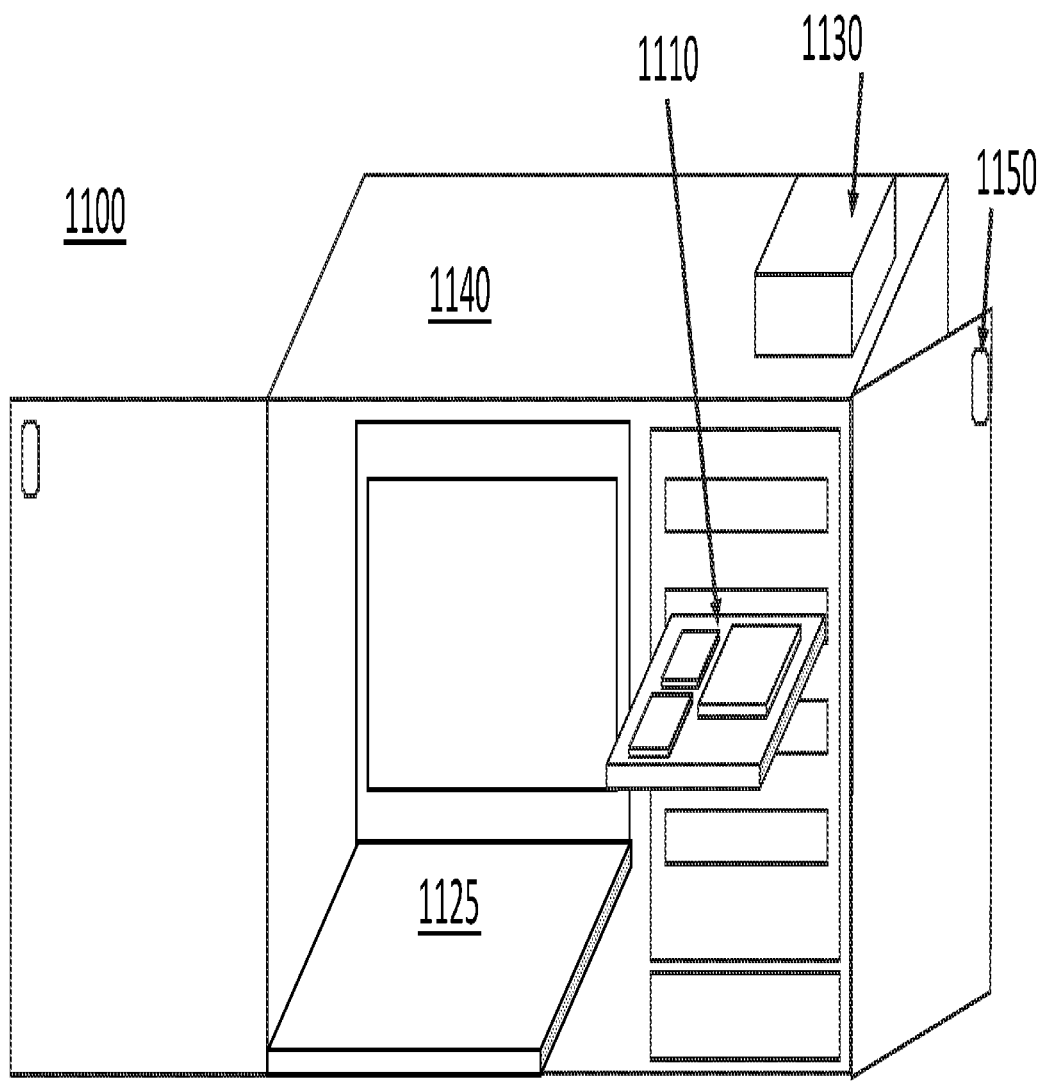
FIG. 11 is a simplified block diagram of an emulation host system isolated in a tamper-proof Faraday cage, in an exemplary embodiment.

FIG. 11 is a simplified block diagram of a system 1100 for analyzing security of a target facility, by analyzing a golden circuit model in an emulator host system, in an exemplary embodiment. System 1100 may include an emulation host system 1110. Emulation host system 1110 may include a programmable hardware component, including an FPGA. The emulation host system 1110 may include multiple FPGA's ganged together, and in some embodiments such FPGA's may be supported on circuit boards mounted in multiple slots. Emulation host system 1110 may include a programmable software component. Programmable software component may include application software embodied in non-transient computer readable medium. Emulation host system 1110 may include a computer processing platform 1125 including a processor operably coupled with memory for execution of the application software. The computer processing platform 1125 may house and host the software involved with the evaluation process (programming the FPGAs, evaluation, insertion, the libraries, operation, instrument configuration, data collection, data analysis). System 1100 may include an insulated, opaque Faraday cage container 1140 configured to isolate and prevent electromagnetic attacks on the emulation host system 1110 and associated libraries. The libraries may include golden circuit model files library, hardware trojan model files library, trigger model file library, countermeasures model file library, golden model signature library, and trojan model signature library. System 1100 also may include a lock 1150 on Faraday cage container 1140 to physically secure the emulation host system 1110 and computer processing platform 1125, to prevent tampering and corrupting of the emulation host system 1110 and libraries. The lock 1150 may be configured to secure the case and complete the Faraday cage. In an embodiment, the Faraday cage container 1140 may be an opaque, lockable cabinet or case as shown in FIG. 11, or other suitable electromagnetic isolating container, that is further configured to isolate the emulation host system from external attacks, interventions or communications by way of sounds, vibrations, electro-magnetic emissions, thermal conditions such as hot spots, and light, such as lasers, to prevent side-channel attacks and communications from, or into, the emulation host system 1100 and libraries. Such interventions otherwise might be employed to defeat security of the emulation host system 1100 and libraries. System 1100 may include a set of external detection instruments 1130 configured to sense outside attacks, sense emissions from inside the Faraday cage 1140, such as emissions from the emulation host system 1110 or computer processing system 1125, or from internally housed power supplies (not shown in FIG. 11). The internally housed power supplies must be protected from tampering, because modulating power supply is a known Trojan type of trigger, payload, or both.

Figure 12:
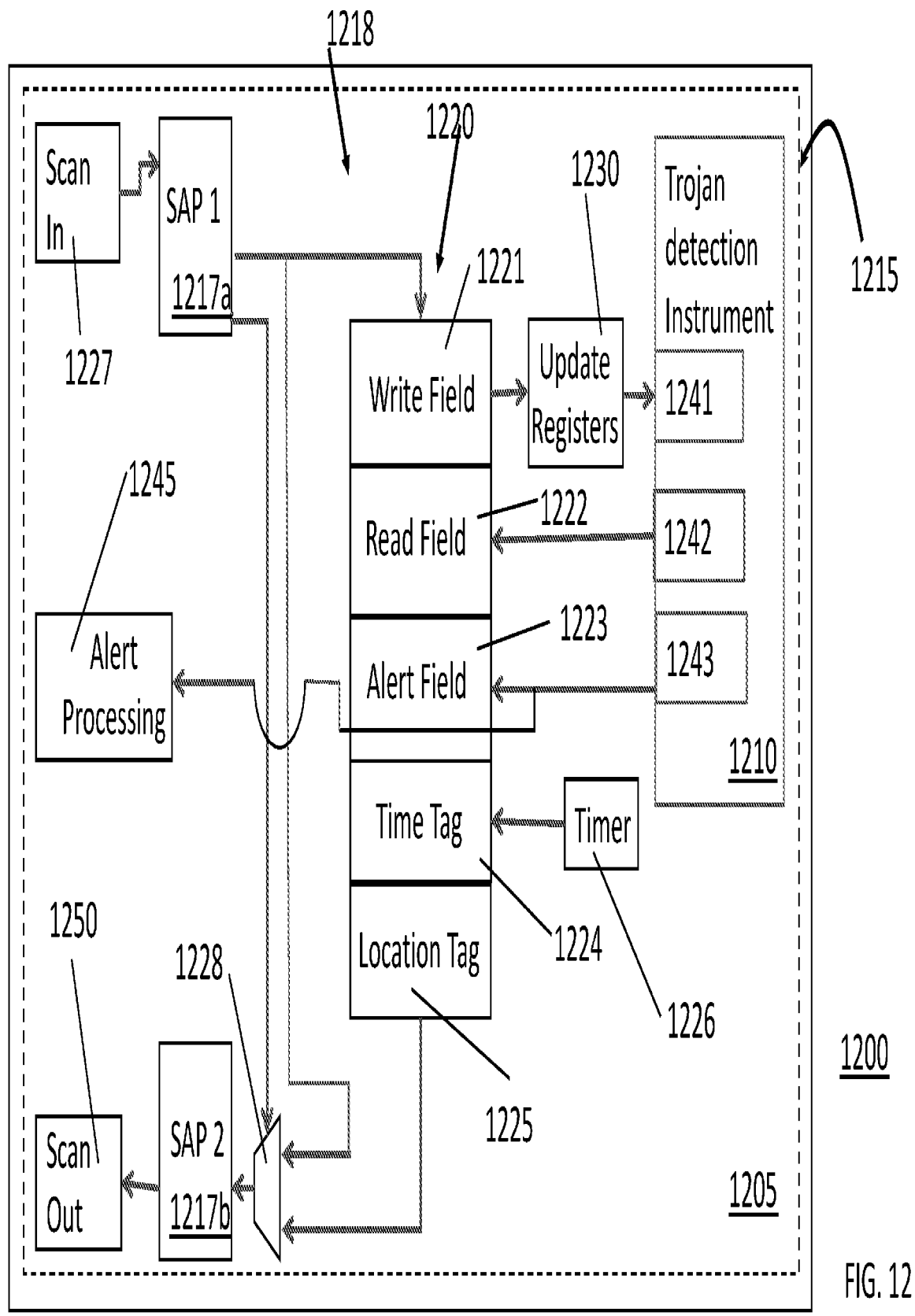
FIG. 12 is a simplified block diagram of facility, showing details of a trojan instrument facility, in an embodiment.

FIG. 12 is a simplified block diagram of a facility 1200 including a hardware trojan instrument system or facility 1205 (hereinafter "trojan instrument facility"), in an exemplary embodiment. Integrated circuit 1200 may include one or a plurality of trojan instrument facilities 1205 each placed or located at a corresponding trojan instrument location 1215. Trojan instrument facility 1205 may be configured to monitor a logic circuit (not shown) of the integrated circuit 1200. Trojan instrument facility 1205 may include a trojan detection instrument 1210 ("trojan instrument") placed or located in a trojan instrument location 1215 in the integrated circuit 1200. The trojan instrument location 1215 may be a selected one of a plurality of predetermined predicted trojan instrument locations 1215 in the integrated circuit 1200. In some embodiments, the selected one of a plurality of predetermined predicted trojan instrument locations 1215 may be determined as a function of a trojan instrument prediction algorithm (not shown). In some embodiments, the trojan instrument prediction algorithm may be related to, or a function of, a hardware trojan prediction algorithm (not shown).

Referring to FIG. 12, the trojan detection instrument 1210 may be operable to compare a logic circuit output or logic circuit parameter against a reference limited threshold defined in relation to detecting hardware trojan activity. For example, at a location where a behavior modification trojan may be located and when activated may cause unexpected behavior of a logic circuit performing operations, the trojan detection instrument 1210 may include a timer for capturing a logic circuit parameter, which is the start to finish time for operations performed by the circuit. The trojan detection instrument 1210 also may include a stored reference limited threshold for worst-case time for the circuit to perform operations. The trojan detection instrument 1210 may compare the logic circuit parameter, which is the actual time captured for the circuit performing operations, against the reference limited threshold time. The trojan detection instrument 1210 may also consider a related logic circuit parameter, by maintaining a count of out-of-time events where the actual time captured for the circuit exceeds the reference limited threshold time. When the trojan detection instrument 1210 compares the logic circuit parameter (count of out-of-time events) to the reference limited threshold (maximum acceptable count of out-of-time events) and determines that the count or frequency of out-of-time events exceeds a reference limited threshold for that count or frequency determined or selected as differentiating delinquent operation from timely operation of the circuit, the trojan detection instrument 1210 then may output an alert data output or alert output. The alert data output may be received by an alert field 1223 of a scannable register 1220, as further described below. The trojan detection instrument 1210 may include analogous reference limited thresholds in relation to detecting hardware trojan activity, where the mode of operation of the trojan detection instrument differs, and where the possible hardware trojan functions in a different mode. For example, where a leaker-type trojan may be present, the trojan detection instrument may monitor activity of digital pins, for changes of logic level or state, changes of voltage level associated with logic level, for instructions, or temperature anomalies. For example, also, where a behavior modification-type trojan may be present, the trojan detection instrument may monitor rate of errors in internal data transfers, errors in time to perform operations, or both. Where a reliability-type trojan may be present, for example, trojan detection instrument may monitor rate of errors in internal data transfers, errors in time to perform operations, or both, or both, and may use circuit correctness assertions to detect faulty or erroneous fault-like or defect-like behavior.

Trojan instrument facility 1205 may include a plurality of scannable access points (1217a, 1217b) arranged in series. Trojan instrument facility 1205 may include one or more instrument interfaces 1218. Each instrument interface 1218 may include, or may be configurable for active operations with, a scannable register 1220. The scannable register 1220 may comprise register write field 1221, register read field 1222, register alert field 1223, register time tag 1224, and register location tag 1225. Trojan instrument facility 1205 may include a scan input 1227 connected to write field 1221 to provide write input thereto. Trojan instrument facility 1205 may include a write update register 1230 in communication with write field 1221 to receive write update from write field 1221 in relation to scan input 1227. Trojan detection instrument 1210 may include write input 1241 connected to write update register 1230 to receive write input commands or instructions from the write update register 1230.

Trojan detection instrument 1210 may include a plurality of bits, inputs and outputs. The trojan instrument plurality of bits may include instrument write input 1241, instrument read output 1242, and instrument alert output 1243. The instrument read output 1242 may be in communication with register read field 1222 to provide read output from the trojan instrument 1205 to register read field 1222. The instrument alert output 1243 may be in communication with register alert field 1223 to provide alert data output or alert output to register alert field 1223. Trojan detection instrument 1210 may be operable to detect the presence of a hardware trojan (not shown in FIG. 12) as a function of corruption of first data of the integrated circuit 1200. Trojan detection instrument 1210 may be operable to detect the presence of a hardware trojan (not shown in FIG. 12) as a function of comparing logic circuit output or a logic circuit parameter against a stored reference limited threshold defined in relation to detecting hardware trojan activity or hardware trojans.

Trojan instrument facility 1205 may include alert processing 1245 connected to receive output alert data directly from instrument alert output 1243, indirectly from register alert field 1223, or both. Trojan instrument facility 1205 may include a scan output 1250 connected to the shift-capture registers 1220 to receive output therefrom. Trojan instrument facility 1205 may include one or a plurality of scannable access points (1217a, 1217b). The plurality of scannable access points (1217a, 1217b) may be connected in series, accessible and selectable via a multiplexer 1228.

Scannable register 1220 may include location tag field 1224. Location tag field 1224 may store location tag data. The location tag data may identify a location of the trojan detection instrument 1210 in the integrated circuit 1200.

Scannable register 1220 may include time tag field 1225. Time tag field 1225 may store time tag data, such as time tag data for an event. The time tag data may be provided from a timer, counter, clock, or other timing data source 1226.

Trojan detection instrument 1210 may be placed or located in an instrument location 1215 in the integrated circuit 1200, chip, circuit board or electronic device. The instrument location 1215 may be a selected one of a plurality of predetermined predicted trojan instrument locations 1215 in the integrated circuit 1200, chip, circuit board or electronic device.

Figure 13:
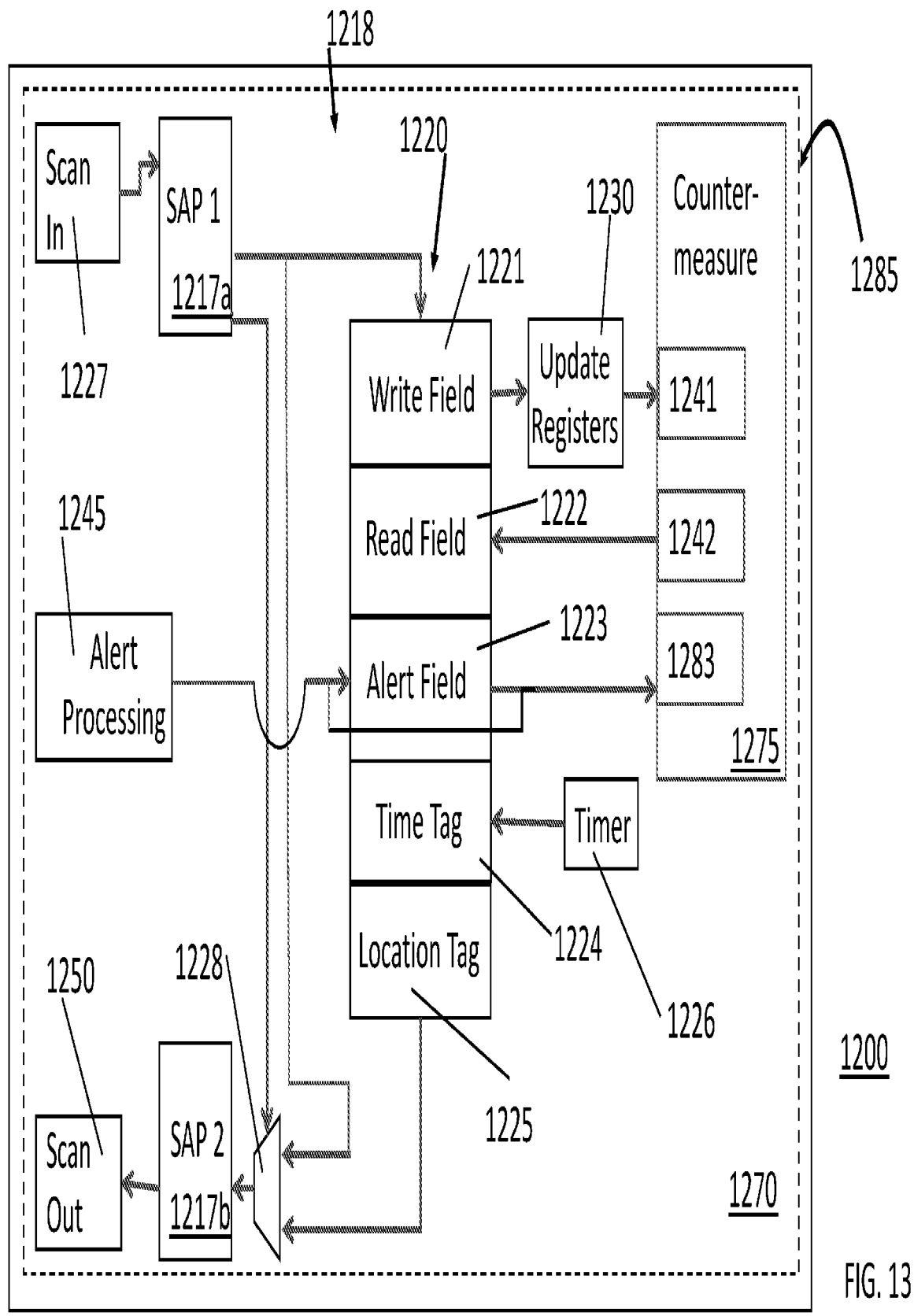
FIG. 13 is a simplified block diagram of a facility, showing details of a countermeasure facility, in an embodiment.

The trojan instrument facility 1205 may include alert logic configured to cause opening of, or to selectively open, an active one of the plurality of scannable access points (1217a, 1217b). The trojan instrument facility 1205 may be configured, in relation to opening the selected active scannable access point (1217a, 1217b), to insert the scannable register 1220 into an active scan chain associated with one of the plurality of instrument interfaces 1218. The trojan instrument facility 1205 also may be configured to provide the alert data output 1243 to alert processing 1245 logic outside the active scan chain, the register alert field 1223, or both. Referring to FIG. 13, the trojan instrument facility 1205 may be further configured to provide the output alert data to a countermeasure facility 1270 to activate countermeasure 1275.

In an embodiment, as shown in FIGS. 12-13, the trojan instrument facility 1205 may include, for example, trojan instrument facility 1205 having a scan path including shift and capture register elements 1220. The shift and capture register elements 1220 may be scannable cells. In embodiments, trojan instrument facility 1205 may be accessible via JTAG, IJTAG or JTAG-like boundary scan protocols, or other serial serial interfaces such as I2C or SPI.

In an embodiment, trojan instrument 1210 may produce read data output 1242 which is provided to the register read field 1222. Trojan instrument 1210 may produce alert data output 1243, which may be provided to the register alert field 1223, directly to alert processing logic 1245, or both. The register alert field 1223 may feed real-time alert system or logic 1245, countermeasure facility 1270, or both, (such as an interrupt processor) or may feed directly to countermeasure alert input or pin 1283 of countermeasure 1275.

Referring to FIG. 12, trojan instrument 1210 may receive commands or configuration inputs from the register write field 1221 via write update register 1230, into write input 1241. The trojan instrument facility 1205 may include one, or a plurality, of instrument interfaces 1218. The instrument interface 1218 may include a shift-capture register 1220. The register 1220 may include register write field 1221, register read field 1222, register alert field 1223, time tag 1224, and location tag 1225. In the illustrated arrangement, the time tag 1224 originates from a timer, clock or timing data source 1226 synchronized to system or unit operations of integrated circuit 1200. The location tag 1225 may be a numerical value assigned to a position in the integrated circuit 1200, such as during layout of the integrated circuit 1200, indicating a location where trojan instrument 1210 is placed or located. In an embodiment, the location tag 1224 may be a number that represents, at minimum, an X-Y location within the integrated circuit 1200, electronic device including integrated circuit 1200, circuit board, or electronic system. In an embodiment, the location tag 1224 may also be associated with other information relevant to locating the trojan instrument 1210 in the integrated circuit 1200, such as design module name.

Referring to FIG. 12, in embodiments, trojan instrument 1210 may be analog or digital. If the trojan instrument 1210 is analog, then an analog to digital conversion is performed between the instrument interface shift-capture registers 1220 and the trojan instrument 1210, or within the trojan instrument 1210, so the trojan instrument data output is represented to the data collection instrument interface or shift-capture registers 1220 as digital data.

Referring to FIG. 13, integrated circuit 1200 may include a countermeasure instrument system or countermeasure facility 1270. Referring to FIG. 13, countermeasure facility 1270 may include countermeasure instrument or countermeasure 1275. Countermeasure 1270 may be placed or located in a countermeasure location 1285 in the integrated circuit 1200. The countermeasure location 1285 may be a selected one of a plurality of predetermined predicted countermeasure locations in the integrated circuit 1200. In some embodiments, the selected one of a plurality of predetermined predicted countermeasure locations 1285 may be determined as a function of a countermeasure prediction algorithm.

As shown in FIGS. 12 and 13, the countermeasure facility 1270 may be in communication with trojan instrument facility 1205. In embodiments, for example, the countermeasure 1275 may be configured to receive processed alert data at alert data input 1283 (FIG. 13), where the processed alert data originates at the alert data output of trojan instrument 1210 (shown in FIG. 12). Referring to FIG. 13, the processed alert data may be provided to alert data input 1283 of countermeasure 1275 from alert processing logic 1245, register alert field 1223, or both.

Referring to FIG. 13, countermeasure 1275 may include countermeasure instrument structure configured to perform a countermeasure function in relation to receiving processed alert data at alert data input 1283. In an embodiment as described elsewhere herein, for example, where a behavior modification trojan may be present in the integrated circuit 1200 and when activated may cause unexpected behavior of a logic circuit performing operations and being monitored, and the trojan detection instrument 1210 is configured to determine and count time-bounded operation or event errors, the countermeasure 1275 (shown in FIG. 13) may include an error correction unit providing error corrections, redundant voting circuits and redundant or spare modules which may be activated, or both. In an embodiment where a leaker-type trojan may be present in the integrated circuit 1200, and the trojan detection instrument 1210 may monitor for a logic circuit, the activity of digital pins for changes of logic level or state, the countermeasure 1275 (shown in FIG. 13) may include countermeasure structure configured to perform deactivation of unused digital pins that have been determined to be active when not in use for a known or designed purpose. In embodiments where a behavior modification-type trojan may be present in the integrated circuit 1200, and the trojan detection instrument 1210 may monitor for a logic circuit, the rate of errors in internal data transfers, errors in time to perform operations, or both, the countermeasure 1275 (shown in FIG. 13) may include an error correction unit providing error corrections. In embodiments where a reliability-type trojan may be present, for example, and the trojan detection instrument 1210 may monitor rate of errors in internal data transfers, errors in time to perform operations, or both, the countermeasure 1275 (shown in FIG. 13) may include an error correction unit providing error corrections.

Figure 14:
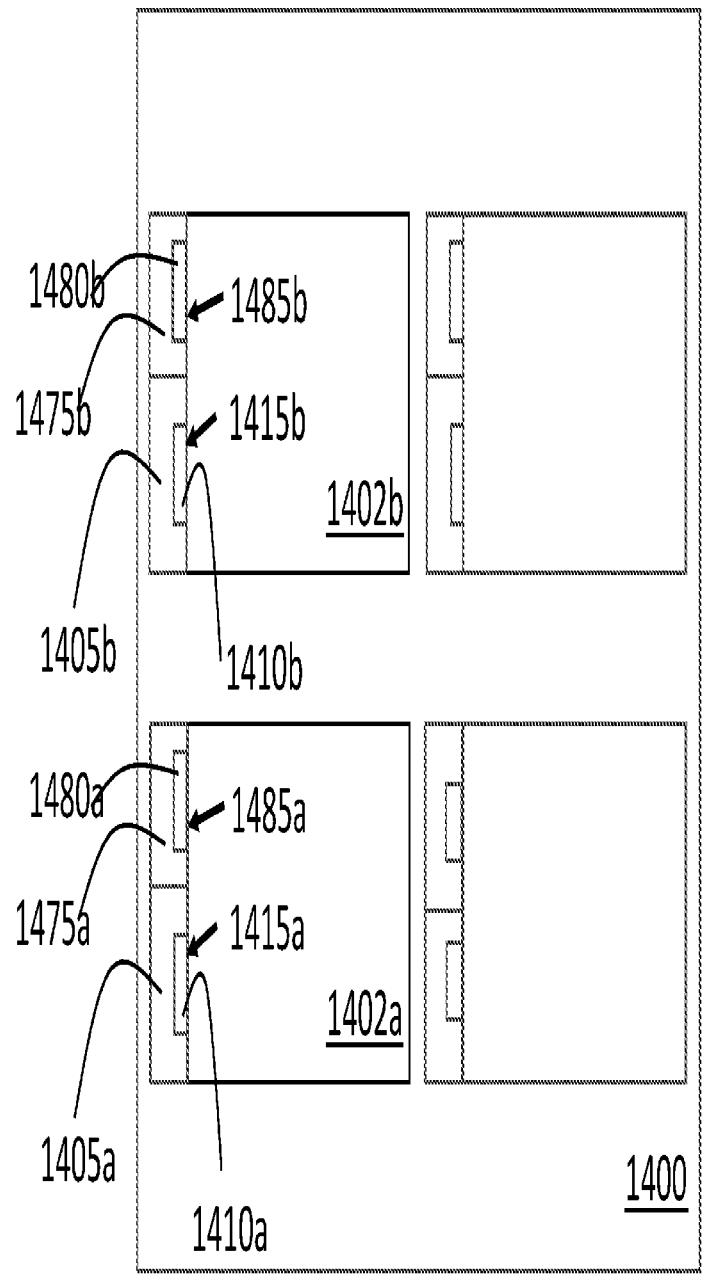
FIG. 14 is a simplified block diagram of a facility, showing logic circuits monitored and protected by trojan instrument facilities and countermeasure facilities.

FIG. 14 is a simplified block diagram illustrating a facility 1400 including a plurality of trojan instrument facilities (1405a, 1405b) and a plurality of countermeasure facilities (1475a, 1475b), in an exemplary embodiment. Integrated circuit 1400 may include a plurality of logic circuits (1402a, 1402b) monitored for protected operation where one or more hardware trojans (not shown) may be present in the logic circuit. It will be understood that each of the nefarious hardware trojans is subject to being activated by a trigger to provide a trojan payload performing an improper trojan function. The plurality of hardware trojans (not shown) will be located at predicted or known hardware trojan locations (not shown) in the logic circuits (1402a, 1402b). Integrated circuit 1400 may include a first trojan instrument facility 1405a configured to monitor the first logic circuit 1402a to detect or determine first trojan activity of the respective first hardware trojan (not shown). First trojan instrument facility 1405a may include first trojan instrument 1410a located at first instrument location 1415a. The type and function of first trojan instrument 1410a may be determined in relation to a prediction, possibility, or information known about the type or category, structure, function or signature of the first hardware trojan (not shown). The first hardware trojan (not shown), for example, may be one of the following types or categories: data leakage, behavior modification, or reliability impairment. The first hardware trojan location (not shown) in the monitored first logic circuit 1402a may be known, identified, determined, or predicted by a prediction algorithm. The first instrument location 1415a may be selected in relation to the first hardware trojan location (not shown), category or function of the first hardware trojan (not shown), or both. Integrated circuit 1400 may include a first countermeasure facility 1475a configured to protect the first logic circuit 1402a. The first countermeasure facility 1475a includes a first countermeasure 1480a that is activated when the first detection instrument 1410a provides alert data output in relation to identifying, detecting or determining activity that is, or may be, associated with the presence of a first hardware trojan. First countermeasure facility 1475a may include first countermeasure 1480a located at first countermeasure location 1485a. The type and function of first countermeasure 1480a, and first countermeasure location 1485a, may be determined in relation to a prediction, possibility, or information known about the type or category, structure, function or signature of the first hardware trojan (not shown) at the known, determined or predicted first hardware trojan location (not shown) in first logic circuit 1402a. The first countermeasure 1480a may be of the types or categories described elsewhere herein for countering or defeating hardware trojans of the category (data leakage, behavior modification, or reliability impairment) that is known, determined or predicted for the first hardware trojan (not shown). The first trojan instrument facility 1405a and first countermeasure facility 1475a are in communication, at least, to provide alert data from the first trojan instrument facility 1405a to the first countermeasure facility 1405b, for activating the first countermeasure 1480a when first hardware trojan activity is detected by first trojan instrument 1410a.

Figure 15:
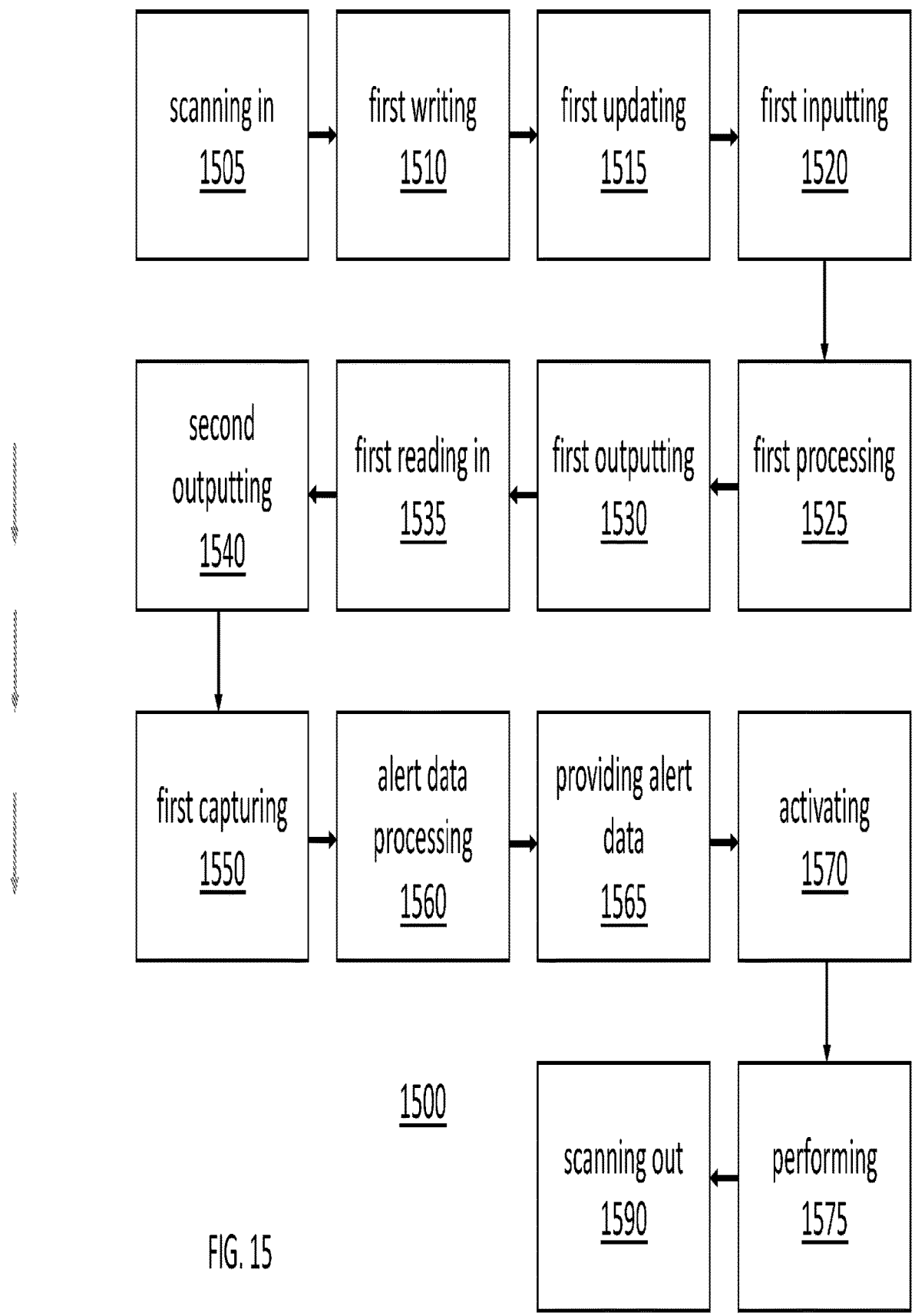
FIG. 15 is a simplified flow diagram of a method for operating a facility including a trojan instrument facility and countermeasure facility, in an exemplary embodiment.

FIG. 15 is a simplified flow diagram of a method 1500 for operating a facility including a trojan instrument system or facility, in an exemplary embodiment. It will be understood that, in embodiments, the subject integrated circuit of method 1500 may be identical to integrated circuit 1200 shown in FIGS. 12-13, and may include a trojan instrument facility and countermeasure facility identical to trojan instrument facility 1205 (FIG. 12) and countermeasure facility 1270 (FIG. 13) described elsewhere herein. The subject trojan instrument facility and countermeasure facility of the integrated circuit of method 1500 may include instrument interfaces and shift-capture registers, identical to those elsewhere described herein for integrated circuit 1200.

Referring to FIG. 15, method 1500 may include scanning in 1505 scan input data of an input vector at a scan input port for a shift-capture register. The scan input data may be a function of operations of the integrated circuit having the trojan instrument system located therein, or an electronic system including the integrated circuit. Method 1500 may include first writing 1510 scan input data to a write field of the shift-capture register. Method 1500 may include first updating 1515 write update data in a write update register from the write field of the shift-capture register. Method 1500 may include first inputting 1520 write input data from the write update register into the trojan instrument, via a write input pin of the trojan instrument. Method 1500 may include first processing 1525 scan chain data, by the trojan instrument, in relation to the write input data. Method 1500 may include first outputting 1530 read scan chain data from the trojan instrument, via a read output pin of the trojan instrument. Method 1500 may include first reading in 1535 the read scan chain data, into a read field of the shift-capture register, from the read output pin of the trojan instrument. Method 1500 may include second outputting 1540 captured scan chain data from the trojan instrument, via a capture output pin of the trojan instrument. Method 1500 may include first capturing 1550 the captured scan chain data, into fields of the shift-capture register. Method 1500 may include alert data processing 1560, by alert processing logic, of alert data output from the alert field of the shift-capture register, or directly from the alert data output to alert processing logic as a function of the trojan instrument detecting activity consist with the presence of a hardware trojan by the trojan instrument. Method 1500 may include providing 1565 alert data from the register alert field or directly from trojan detection instrument, to an alert data input of a countermeasure. Method 1500 may include activating 1570 the countermeasure in relation to providing 1565 the processed alert data. Method 1500 may include the performing 1575 a countermeasure function by the countermeasure in relation to activating 1570 the countermeasure in relation to providing 1565 the processed alert data to the countermeasure. Method 1500 may include scanning out 1590 scan output data from the shift-capture register, at a scan output port.

Figure 16:
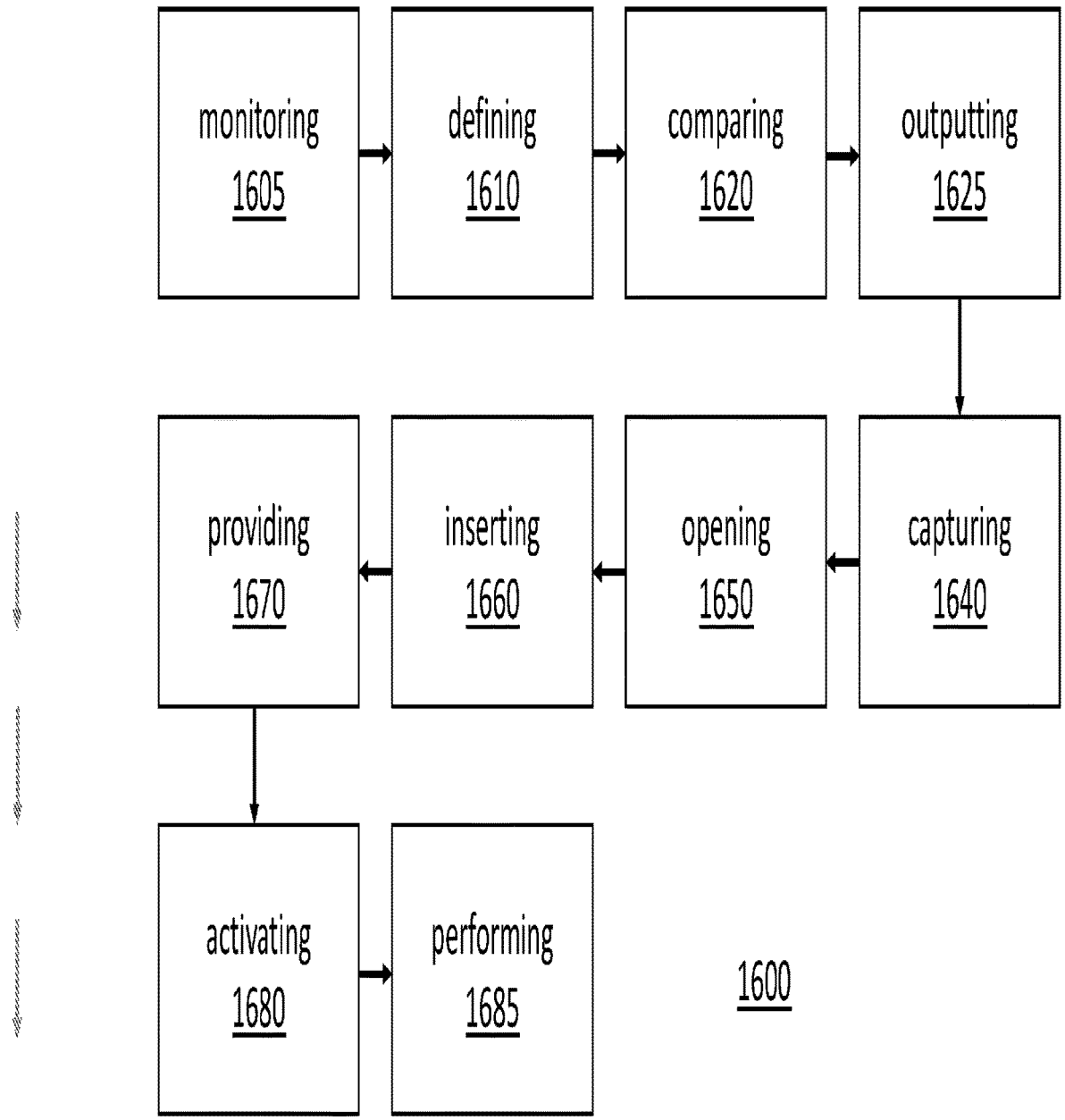
FIG. 16 is a simplified flow diagram of a method for operating a facility including a trojan instrument facility and countermeasure facility, in an exemplary embodiment.

FIG. 16 is a simplified flow diagram of a method 1600 for protected operation of a facility including a trojan instrument facility and countermeasure system, in an exemplary embodiment. It will be understood that, in embodiments, the subject integrated circuit of method 1600, including the trojan instrument facility and countermeasure facility thereof, may be identical to integrated circuit 1200 including trojan instrument facility 1205 and countermeasure 1270, as shown in FIGS. 12-13 and described elsewhere herein. The subject trojan instrument facility may include a plurality of scannable access points arranged in series. The subject trojan instrument facility may include one or a plurality of instrument interfaces. Each of the instrument interfaces may include a scannable register such as, for example, a shift-capture register including a plurality of scan cells. The scannable register may include an alert field. The alert field may be adapted to selectively open an active one of the plurality of scannable access points. It will be understood that the subject trojan instrument facility, countermeasure facility, or both, processing alert data from the alert field, may selectively open or may cause selective opening, of an active one of the one or plurality of scannable access points. The subject trojan detection instrument may be operable to monitor a logic circuit of the integrated circuit that is subject of method 1600. The trojan detection instrument may be operable to compare a logic circuit output or parameter against a reference limited threshold. The reference limited threshold may be defined in relation to detecting hardware trojan activity. The trojan detection instrument may be operable to output alert data in relation to comparing the logic circuit output or parameter against the reference limited threshold.

Method 1600 may include monitoring 1605 the logic circuit, by the trojan instrument facility. Method 1600 may include defining 1610 a reference limited threshold in relation to detecting hardware trojan activity, in the trojan detection instrument. Method 1600 may include comparing 1620, by the trojan detection instrument, logic circuit output against the reference limited threshold. Method 1600 may include the trojan detection instrument outputting 1625 alert data output as a function of said comparing 1620. Method 1600 may include capturing 1640 the alert data output, by the alert field of said scannable register. Method 1600 may include opening 1650 an active one of the plurality of scannable access points, as a function of the capturing 1640 the alert data output, by the alert field. Method 1600 may include, as a function of the opening 1650, inserting 1660 the scannable register into an active scan chain with an associated one of said plurality of instrument interfaces. Method 1600 may include providing 1670 the alert data output to alert processing logic outside the active scan chain. Method 1600 also may include activating 1680 the countermeasure responsive to the countermeasure receiving the alert data output. Method 1600 may include performing 1685 the countermeasure function by the countermeasure, responsive to activating 1680 the countermeasure in relation to providing 1670 the alert data output.

Figure 17A:
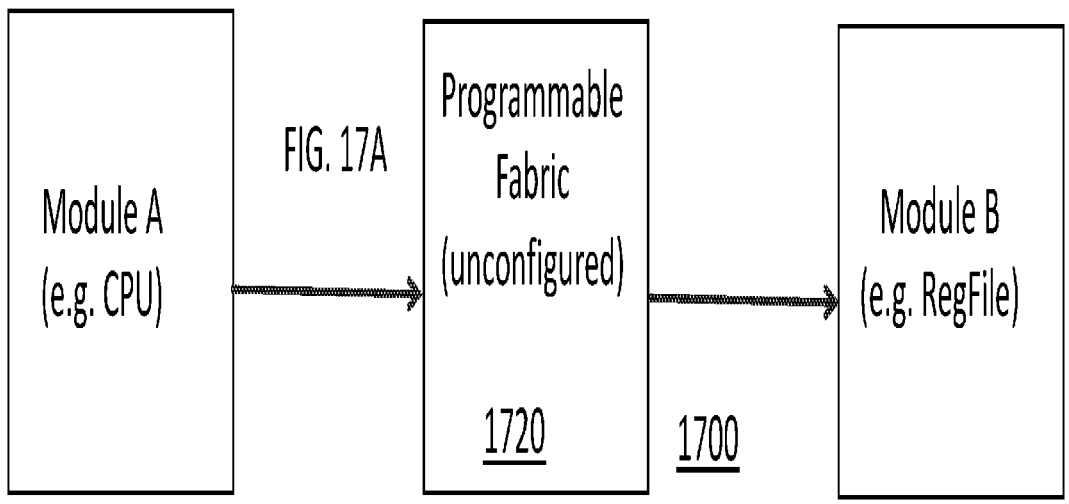
FIG. 17A is a simplified block diagram of a facility including an unconfigured programmable fabric, in an embodiment.
Figure 17B:
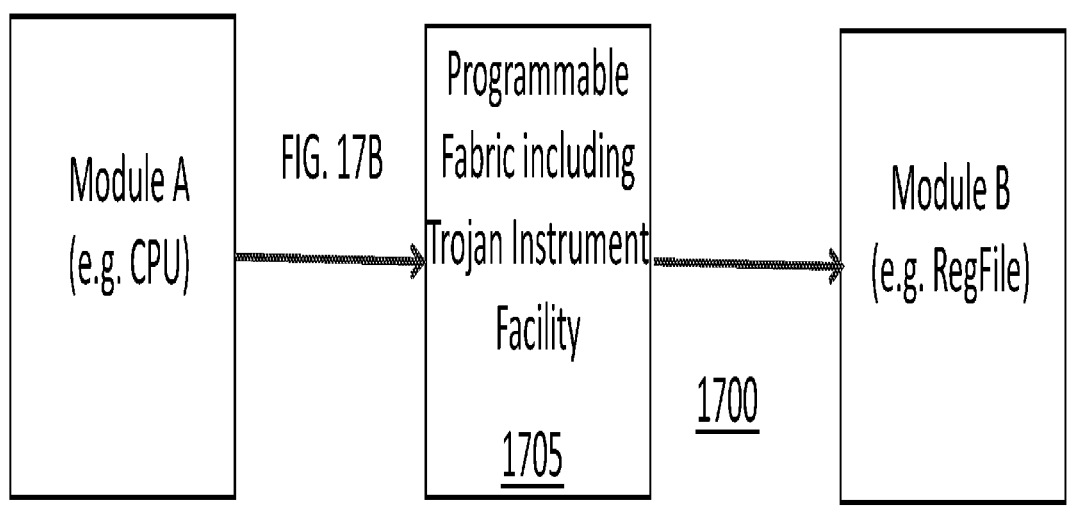
FIG. 17B is a simplified block diagram of the facility shown generally in FIG. 17A, with the programmable fabric including a secured trojan instrument facility.
Figure 17C:
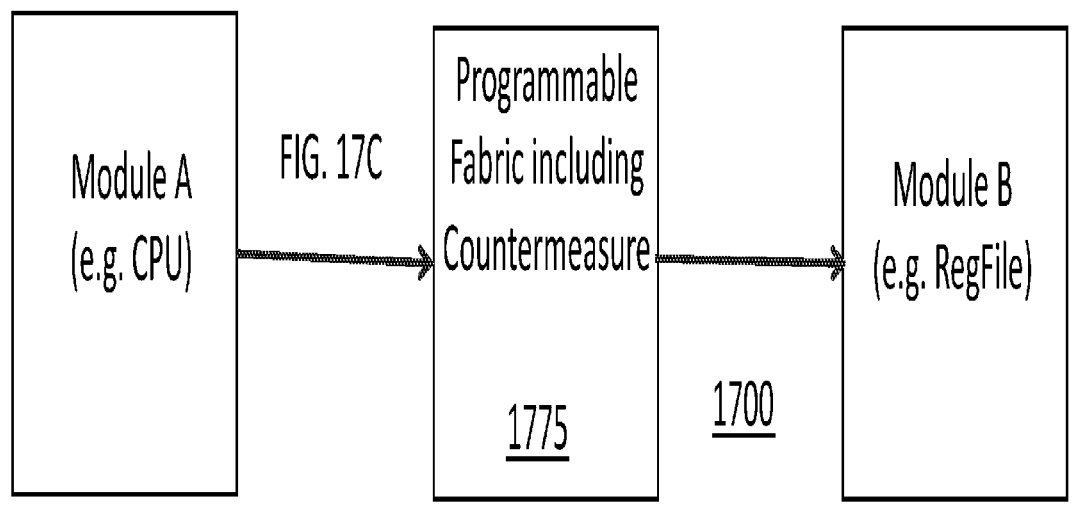
FIG. 17C is a simplified block diagram of the facility shown generally in FIG. 17A, with the programmable fabric including a secured countermeasure facility.

FIG. 17A is a simplified block diagram illustrating a facility 1700 including an unconfigured programmable fabric 1720, in an exemplary embodiment. FIG. 17B is a simplified block diagram of the integrated circuit shown generally in FIG. 17A, with the programmable fabric including a secured trojan instrument facility. FIG. 17C is a simplified block diagram of the integrated circuit shown generally in FIG. 17A, with the programmable fabric including a secured countermeasure facility. Integrated circuit 1700, trojan instrument facility 1705 and countermeasure facility 1775 may be identical to the integrated circuits, trojan instrument facilities and countermeasure facilities in embodiments described and illustrated elsewhere in this disclosure, except as otherwise described in this paragraph or shown in FIGS. 17A-17C. As shown in FIG. 17A, integrated circuit 1700 may include the unconfigured programmable fabric 1720 located in one or a plurality of areas or locations where each secured trojan instrument facility and secured countermeasure facility will be placed or installed to monitor and protect logic circuits. Integrated circuit 1700 may be designed, processed and manufactured in an untrusted facility. Integrated circuit 1700 may include a plurality of unverified logic blocks and circuits licensed from untrusted third parties under licenses for Intellectual Property Cores (IP Cores). The unconfigured programmable fabric 1720 (shown in FIG. 17A) may be installed in the design, processing and manufacturing of a processed silicon chip (not shown) having integrated circuit 1700 formed thereupon, in untrusted facilities. The integrated circuit 1700 including unconfigured programmable fabric 1720 may be tested in accordance with regular testing procedures for QA/QC of integrated circuits, in an untrusted facility. The silicon chip including integrated circuit 1700 thereafter may be delivered to a trusted, secure facility. As shown in FIG. 17B, the integrated circuit 1700 may include the programmable fabric having the secured trojan instrument facility 1705 installed in the trusted, secure facility according to secure installation procedures. As shown in FIG. 17C, the integrated circuit 1700 may include the programmable fabric having the secured countermeasure facility 1775 installed in the trusted, secure facility according to secure installation procedures. The integrated circuit 1700 thus may be monitored and protected by having the secured trojan instrument facility 1705 and secured countermeasure facility 1775 installed in the programmable fabric 1720 in relation to a predetermined secure installation procedure in the trusted, secure facility. The secured trojan instrument facility 1705 and secured countermeasure facility 1775 thus may be installed in programmable fabric 1720 in a trusted, secure facility, whereas the processed silicon chip including integrated circuit 1700 may include unverified, licensed IP Cores embodied in licensed logic blocks and circuits, which may be designed, processed, manufactured, and tested in untrusted facilities outside control of the finished product manufacturer. The finished product thus may include the monitored and protected integrated circuit and/or an electronic device, circuit board, or electronic system including the same.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

What is claimed is:

1. An apparatus comprising:
a first programmable logic fabric configured as a trojan detection instrument operable to:
detect hardware trojan activity by testing that comprises comparing a logic circuit output against a reference limited threshold during ongoing functional operation of said logic circuit, said logic circuit output comprising actual time captured for said logic circuit performing operations, said reference limited threshold defined in relation to detecting hardware trojan activity during ongoing functional operation of said logic circuit;
determine, in relation to the at least one of a worst-case time and a best-case time, a corresponding at least one of a high out-of-time event for actual time exceeding the worst-case time and a low out-of-time event for actual time less than the best-case time;
maintain a count of high out-of-time events and a count of low out-of-time events; and
output alert data where the maintained count is outside the at least one of a high threshold count and low threshold count; and
said reference limited threshold comprising:
at least one of a worst-case time and a best-case time for said logic circuit to perform operations; and
at least one of a high threshold count and low threshold count to differentiate delinquent operation of said logic circuit.

2. The apparatus of claim 1 further comprising:
a plurality of Internal Joint Test Action Group (IJTAG) scannable access points arranged in series;
a plurality of instrument interfaces each comprising an IJTAG scannable register comprising an alert field;
said alert field configured to capture said output alert data, said alert field adapted to selectively open an active one of said plurality of scannable access points;
said trojan instrument facility configured to insert, in relation to said opening, said scannable register into an active IJTAG scan chain with an associated one of said plurality of instrument interfaces.

3. The apparatus of claim 1 further comprising:
said first programmable logic fabric configured as said trojan detection instrument according to a secure configuration procedure.

4. The apparatus of claim 3 further comprising:
a plurality of IJTAG scannable access points arranged in series;
a plurality of instrument interfaces each comprising an IJTAG scannable register comprising an alert field;
said alert field configured to capture said output alert data, said alert field adapted to selectively open an active one of said plurality of scannable access points;
said trojan instrument facility configured to insert, in relation to said opening, said scannable register into an active IJTAG scan chain with an associated one of said plurality of instrument interfaces.

5. The apparatus of claim 1 further comprising:
a second programmable logic fabric configured as a countermeasure to compensate for activity of said hardware trojan, said countermeasure activated in relation to said alert data, and said activated countermeasure compensating for activity of said hardware trojan.

6. The apparatus of claim 5 further comprising:
a plurality of IJTAG scannable access points arranged in series;
a plurality of instrument interfaces each comprising an IJTAG scannable register comprising an alert field;
said alert field configured to capture said output alert data, said alert field adapted to selectively open an active one of said plurality of scannable access points;
said trojan instrument facility configured to insert, in relation to said opening, said scannable register into an active IJTAG scan chain with an associated one of said plurality of instrument interfaces.

7. The apparatus of claim 5 further comprising:
said first programmable logic fabric configured as said trojan detection instrument according to a secure configuration procedure; and
said second programmable logic fabric configured as a countermeasure according to a secure configuration procedure.

8. The apparatus of claim 7 further comprising:
a plurality of IJTAG scannable access points arranged in series;
a plurality of instrument interfaces each comprising an IJTAG scannable register comprising an alert field;
said alert field configured to capture said output alert data, said alert field adapted to selectively open an active one of said plurality of scannable access points;
said trojan instrument facility configured to insert, in relation to said opening, said scannable register into an active IJTAG scan chain with an associated one of said plurality of instrument interfaces.

9. A method for operating a facility, said facility comprising:
a plurality of programmable logic fabrics;
said method comprising:
programming a first programmable logic fabric configured as a trojan detection instrument;
programming a second programmable logic fabric configured as a countermeasure;
operating said trojan detection instrument, said trojan detection instrument being operable to:
detect hardware trojan activity by testing that comprises comparing a logic circuit output against a reference limited threshold during ongoing functional operation of said logic circuit, said logic circuit output comprising actual time captured for said logic circuit performing operations, said reference limited threshold defined in relation to detecting hardware trojan activity during ongoing functional operation of said logic circuit;

determine, in relation to the at least one of a worst-case time and a best-case time, a corresponding at least one of a high out-of-time event for actual time exceeding the worst-case time and a low out-of-time event for actual time less than the best-case time;

maintain a count of high out-of-time events and a count of low out-of-time events; and output alert data where the maintained count is outside the at least one of a high threshold count and low threshold count; and said reference limited threshold comprising:

at least one of a worst-case time and a best-case time for said logic circuit to perform operations; and at least one of a high threshold count and low threshold count to differentiate delinquent operation of said logic circuit; and operating said countermeasure in response to said trojan detection instrument detecting said trojan activity.

10. The method of claim 9 wherein:

said programming of said first programmable logic fabric configured as a trojan detection instrument is further characterized as according to a secure configuration procedure; and said programming of said second programmable logic fabric configured as a countermeasure is further characterized as according to a secure configuration procedure.

11. An integrated circuit comprising:

a first programmable logic fabric configured as a trojan detection instrument operable to:

detect hardware trojan activity by testing that comprises comparing a logic circuit output against a reference limited threshold during ongoing functional operation of said logic circuit, said logic circuit output comprising actual time captured for said logic circuit performing operations, said reference limited threshold defined in relation to detecting hardware trojan activity during ongoing functional operation of said logic circuit;

determine, in relation to the at least one of a worst-case time and a best-case time, a corresponding at least one of a high out-of-time event for actual time exceeding the worst-case time and a low out-of-time event for actual time less than the best-case time;

maintain a count of high out-of-time events and a count of low out-of-time events; and output alert data where the maintained count is outside the at least one of a high threshold count and low threshold count; and said reference limited threshold comprising:

at least one of a worst-case time and a best-case time for said logic circuit to perform operations; and at least one of a high threshold count and low threshold count to differentiate delinquent operation of said logic circuit.

12. The integrated circuit of claim 11 further comprising:

a plurality of Internal Joint Test Action Group (IJTAG) scannable access points arranged in series;

a plurality of instrument interfaces each comprising an IJTAG scannable register comprising an alert field;

said alert field configured to capture said output alert data, said alert field adapted to selectively open an active one of said plurality of scannable access points;

said trojan instrument facility configured to insert, in relation to said opening, said scannable register into an active IJTAG scan chain with an associated one of said plurality of instrument interfaces.

13. The integrated circuit of claim 11 further comprising:

said first programmable logic fabric configured as said trojan detection instrument according to a secure configuration procedure.

14. The integrated circuit of claim 13 further comprising:

a plurality of IJTAG scannable access points arranged in series;

a plurality of instrument interfaces each comprising an IJTAG scannable register comprising an alert field;

said alert field configured to capture said output alert data, said alert field adapted to selectively open an active one of said plurality of scannable access points;

said trojan instrument facility configured to insert, in relation to said opening, said scannable register into an active IJTAG scan chain with an associated one of said plurality of instrument interfaces.

15. The integrated circuit of claim 11 further comprising:

a second programmable logic fabric configured as a countermeasure to compensate for activity of said hardware trojan, said countermeasure activated in relation to said alert data, and said activated countermeasure compensating for activity of said hardware trojan.

16. The integrated circuit of claim 15 further comprising:

a plurality of IJTAG scannable access points arranged in series;

a plurality of instrument interfaces each comprising an IJTAG scannable register comprising an alert field;

said alert field configured to capture said output alert data, said alert field adapted to selectively open an active one of said plurality of scannable access points;

said trojan instrument facility configured to insert, in relation to said opening, said scannable register into an active IJTAG scan chain with an associated one of said plurality of instrument interfaces.

17. The integrated circuit of claim 15 further comprising:

said first programmable logic fabric configured as said trojan detection instrument according to a secure configuration procedure; and said second programmable logic fabric configured as a countermeasure according to a secure configuration procedure.

18. The integrated circuit of claim 17 further comprising:

a plurality of IJTAG scannable access points arranged in series;

a plurality of instrument interfaces each comprising an IJTAG scannable register comprising an alert field;

said alert field configured to capture said output alert data, said alert field adapted to selectively open an active one of said plurality of scannable access points;

said trojan instrument facility configured to insert, in relation to said opening, said scannable register into an active IJTAG scan chain with an associated one of said plurality of instrument interfaces.

* * * * *